US008539505B2

(12) United States Patent
Kodaganur et al.

(10) Patent No.: US 8,539,505 B2
(45) Date of Patent: *Sep. 17, 2013

(54) AUTOMATICALLY ARRANGING OBJECTS IN A SELECTED PORTION OF A GRAPHICAL PROGRAM BLOCK DIAGRAM

(75) Inventors: Anand Kodaganur, Bangalore (IN); Subbaiah Kandera Gopal, Bangalore (IN); Vineeth Kashyap, Shimoga (IN); Craig Smith, Austin, TX (US); Bharath Dev, Mysore (IN)

(73) Assignee: National Instruments Corporation, Austin, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/847,368

(22) Filed: Jul. 30, 2010

(65) Prior Publication Data

US 2011/0022975 A1   Jan. 27, 2011

Related U.S. Application Data

(63) Continuation-in-part of application No. 11/774,651, filed on Jul. 9, 2007.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |

(52) U.S. Cl.
USPC ........................................................ 719/312

(58) Field of Classification Search
USPC ........................................................ 719/312
See application file for complete search history.

(56) References Cited

U.S. PATENT DOCUMENTS

| | | | |
|---|---|---|---|
| 4,953,106 A | | 8/1990 | Gansner et al. |
| 5,367,625 A | * | 11/1994 | Ishitani ..................... 715/810 |
| 5,475,851 A | | 12/1995 | Kodosky et al. |
| 5,481,740 A | | 1/1996 | Kodosky |
| 5,481,741 A | | 1/1996 | McKaskle et al. |
| 5,838,317 A | | 11/1998 | Bolnick et al. |
| 6,774,899 B1 | * | 8/2004 | Ryall et al. .................. 345/440 |
| 7,062,718 B2 | | 6/2006 | Kodosky et al. |
| 2003/0184580 A1 | * | 10/2003 | Kodosky et al. ............. 345/734 |
| 2005/0066285 A1 | * | 3/2005 | Santori et al. ............... 715/763 |

(Continued)

OTHER PUBLICATIONS

K. Sugiyama, S. Tagawa, M. Toda; "Methods for Visual Understanding of Hierarchical System Structures"; IEEE Transactions on Systems, Man, and Cybernetics; vol. SMC-11; No. 2; pp. 109-125; Feb. 1981.

(Continued)

*Primary Examiner* — Andy Ho
*Assistant Examiner* — Timothy A Mudrick
(74) *Attorney, Agent, or Firm* — Meyertons Hood Kivlin Kowert & Goetzel, P.C.; Jeffrey C. Hood

(57) ABSTRACT

Various embodiments of a system and method for automatically arranging or positioning objects included in a selected portion of a graphical program are described. A user may select a first portion of the graphical program. The graphical programming development environment may automatically re-arrange the selected first portion of the graphical program without re-arranging the rest of the graphical program. For example, nodes in the first portion of the graphical program may be automatically re-positioned so as to better organize the first portion of the graphical program.

21 Claims, 30 Drawing Sheets

(56) References Cited

U.S. PATENT DOCUMENTS

2005/0257203 A1 11/2005 Nattinger
2008/0034292 A1 2/2008 Brunner et al.
2008/0052617 A1 2/2008 Guido et al.

OTHER PUBLICATIONS

E.R. Gansner, E. Koutsofios, S.C. North, K.P. Vo: "A Technique for Drawing Directed Graphs"; IEEE Transactions on Software Engineering; vol. 19, No. 3, pp. 214-230; Mar. 1993.

* cited by examiner

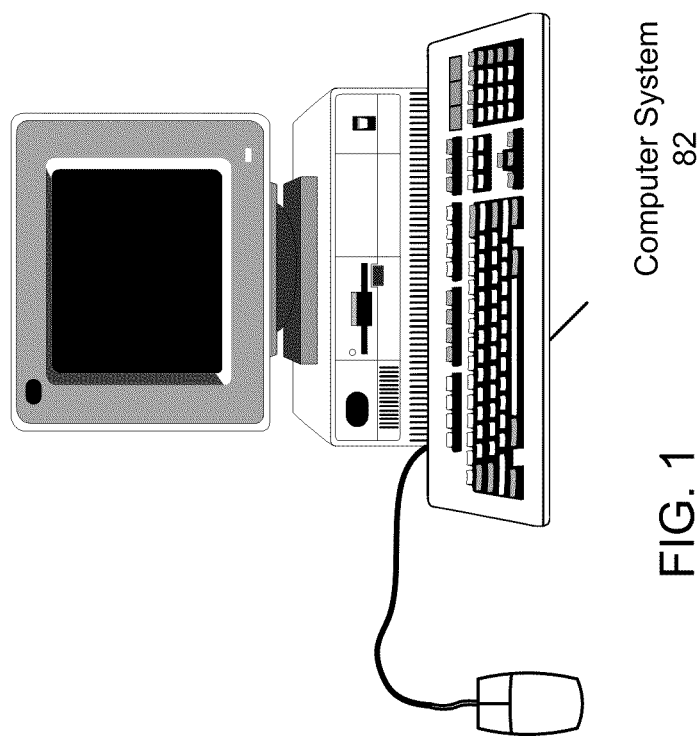

```
PartialLayout (G, S)
// where: G is the graph representing the entire block diagram
// S is the set of selected components {G_1, G_2, G_3,..., G_n}
// This method lays out sub-graph G' of G.
Begin
    G' ← G_1 ∪ G_2 ∪ ... ∪ G_n where n = |S|
    S' ← φ
    For i ← 1 to |S|-1 do
        If (G_i ≠ φ ) then
            G_i,i ← G_i
            For k ← i + 1 to |S| do
                For j ← i + 1 to |S| do
                    If Region(G_i,j) Overlaps with Region(G_k) then
                        G_i,j ← G_i,j ∪ G_k
                        G_k ← φ
                    EndIf
                EndFor
                S' ← S' ∪ G_i,j
            EndFor
        EndIf
    EndFor
    ForEach v ∈ { V(G) - V(G') }
        For j ← 1 to |S'| do
            If Region(G_i,j) Encloses v then
                V(G_i,j) ← V(G_i,j) ∪ {v}
                Break out of inner for loop
            EndIf
        EndFor
    EndForEach
    Sort S' in the order of G'(Left), G'(Top), G'(Width), G'(Height)
    ForEach g ∈ Sorted S' Do
        CleanupComponent(g, G, G')
        PlaceComponent(g, G)
    EndForEach
    ForEach e ∈ E(G') where S(e) ∉ V(G') AND D(e) ∉ V(G')
        // In the above line : S(e) is the source end of the edge e, and
        //                     D(e) is the Destination end of edge
        HighlightReRoute(e)
    EndForEach
End
```

FIG. 27

```
CleanupComponent(g, G, G')
// where : g is the graph component to be cleaned,
//         G is the graph representing entire block diagram; and
//         G' is the selected part to be cleaned up
// This method lays out g within G
Begin
    g' ← ( V(G), E(G) where S(E) ∉ V(g) AND D(E) ∉ V(g) )
    E' ← ( E(G) where S(E) ∉ V(g) OR  D(E) ∉ V(g) )
    E" ← ( E(G) where S(E) ∉ V(g) AND D(E) ∉ V(g) )

Min_Left(d) ← ∞ - ∀ d ∈ V(g)
    ForEach e ∈ E'-E"
        if ( S(e) ∉ V(g) AND left(S(e)) ≥ left(g) AND left(S(e)) ≤ right(g) )
        then
            Set Min_Left(D(e)) ← Max( Min_Left(D(e)), left(S(e)))
        endif
    EndForEach CleanupLVDiagram(g')// This is the classic LV Diagram cleanup
    // However, there'll be an extra modification in the algorithm to
    // accommodate the newly introduced extra constraint of Min_Left(v)
    // This constraint forces the minimum left coordinate of the node v
    // to be Min_Left(v).
    // This constraint is implemented in the X-Coordinate calculation
    // section. By having this constraint, the algorithm minimizes the
    // edges going backwards yet maintaining the optimal space usage.
End
```

FIG. 28

```
PlaceComponent(g, G)
// where : g is the graph component to be placed,
//         G is the graph representing entire block diagram
// This method places the well laid out component g within G, in its (g's)
// appropriate position and makes necessary space in G.
// When the space is made it might move other components in G' as well.
// Since in the PartialLayout algorithm the components are sorted before
// their actual placement it reduces the number of repeated movements of
// already cleaned up components.
```

AUTOMATICALLY ARRANGING OBJECTS IN A SELECTED PORTION OF A GRAPHICAL PROGRAM BLOCK DIAGRAM

PRIORITY CLAIM

This is a continuation-in-part of U.S. patent application Ser. No. 11/774,651, titled "Automatically Arranging Objects in a Graphical Program Block Diagram", filed on Jul. 9, 2007, whose inventors were Anand Kodaganur, Arjun J. Singri, Ashwin Prasad, and Karthik S. Murthy.

FIELD OF THE INVENTION

The present invention relates to the field of graphical programming, and more particularly to a system and method for automatically arranging or positioning objects in a block diagram of a graphical program.

DESCRIPTION OF THE RELATED ART

Traditionally, text-based programming languages have been used by programmers in writing application programs. Many different text-based programming languages exist, including BASIC, C, C++, Visual C++, Java, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Graphical programming development environments that enable a user to create a program in a graphical manner without necessarily writing source code in a text-based programming language have been developed. Graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

Graphical programming has become a powerful tool available to programmers. Graphical programming development environments such as National Instruments Corp.'s Lab-VIEW product have become very popular. Tools such as LabVIEW have greatly increased the productivity of programmers, and increasing numbers of programmers are using graphical programming development environments to develop their software applications. In particular, graphical programming tools are being used for applications such as test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of the invention relate to a system and method for automatically re-arranging a selected portion of a graphical program. The graphical program may be displayed on a display and may include a plurality of interconnected nodes that visually indicate functionality of the graphical program. The method may operate to automatically re-arrange a first portion of the graphical program without re-arranging a second portion of the graphical program. For example, the first portion includes a first subset of the plurality of interconnected nodes, and the second portion includes a second subset of the plurality of interconnected nodes. Re-arranging the first portion may comprise re-positioning the nodes included in the first portion relative to each other. In some embodiments the method may operate to re-display the graphical program after re-arranging the first portion of the graphical program. Re-displaying the graphical program may comprise displaying the nodes included in the first portion of the graphical program at new positions relative to each other and displaying nodes included in the second portion of the graphical program at their original positions relative to each other.

BRIEF DESCRIPTION OF THE DRAWINGS

A better understanding of the present invention can be obtained when the following detailed description of the preferred embodiment is considered in conjunction with the following drawings, in which:

FIG. 1 illustrates an example of a computer system that may execute a graphical programming development environment application that implements the automatic arrangement of objects in a graphical program block diagram;

FIGS. 27-29 illustrate an example of a partial layout algorithm for re-arranging only the selected parts of the graphical program without re-arranging other parts.

Figure 2A:
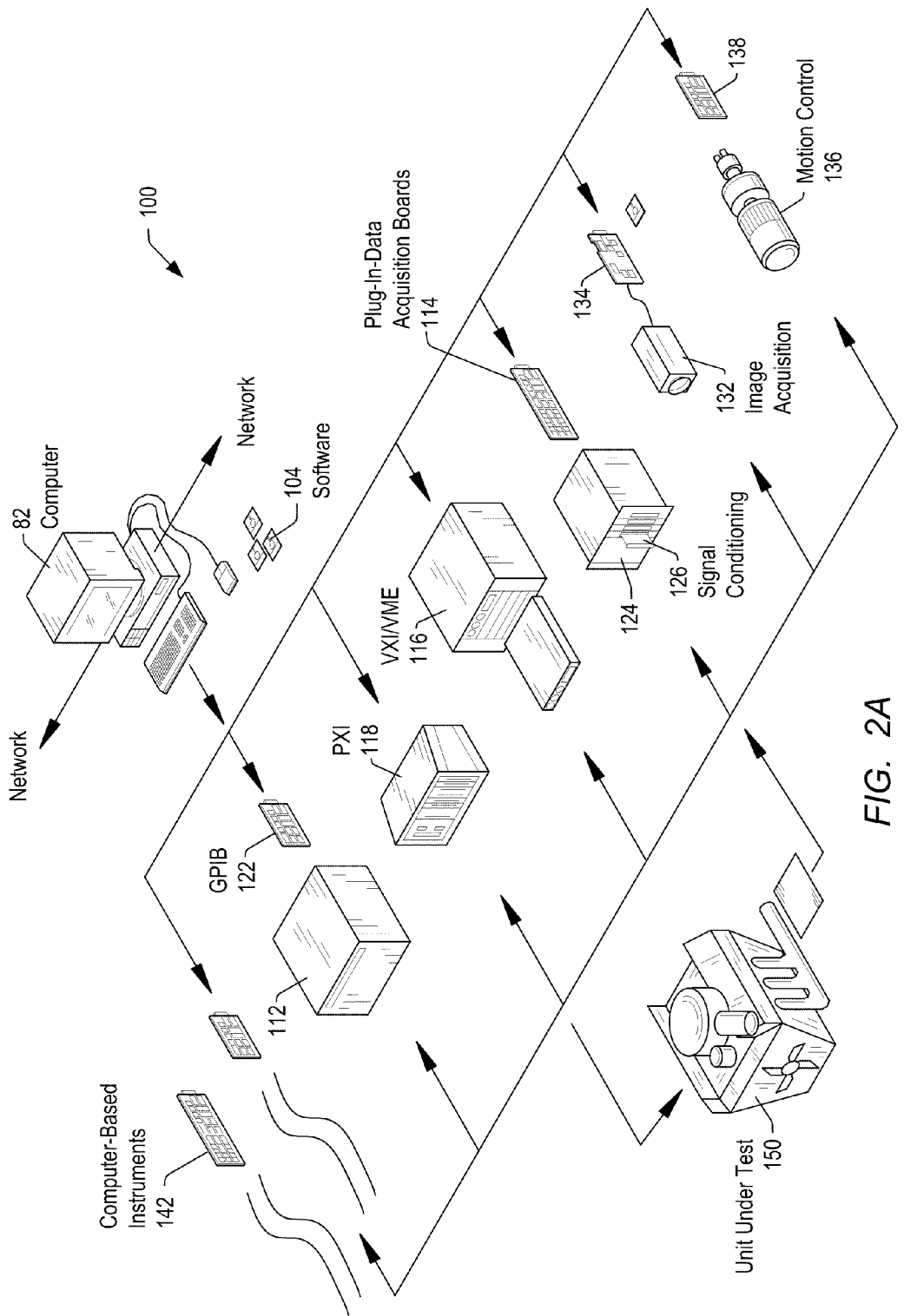
FIG. 2A illustrates an exemplary instrumentation control system 100.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20050268173 (Ser. No. 10/843,107) titled "Programmatically Analyzing a Graphical Program by Traversing Objects in the Graphical Program," filed May 11, 2004.

U.S. Patent Application Publication No. 20090019453 (Ser. No. 11/774,651) titled "Automatically Arranging Objects in a Graphical Program Block Diagram", filed Jul. 9, 2007.

U.S. Patent Application Publication No. 20090089715 A1 (Ser. No. 11/862,488) titled "Automatic Re-Positioning of Graphical Program Nodes during Node Placement or Node Movement", filed Sep. 27, 2007.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected blocks or icons, wherein the plurality of interconnected blocks or icons visually indicate functionality of the program.

The following provides examples of various aspects of graphical programs. The following examples and discussion are not intended to limit the above definition of graphical program, but rather provide examples of what the term "graphical program" encompasses:

The blocks in a graphical program may be connected in one or more of a data flow, control flow, and/or execution flow format. The blocks may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks are often referred to as the block diagram portion of the graphical program.

Block—In the context of a graphical program, an element that may be included in a graphical program. A block may have an associated icon that represents the block in the graphical program, as well as underlying code or data that implements functionality of the block. Exemplary blocks include function blocks, sub-program blocks, terminal blocks, structure blocks, etc. Blocks may be connected together in a graphical program by connection icons or wires.

The blocks in a graphical program may also be referred to as graphical program nodes or simply nodes.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics.

Wires may indicate communication of data, timing information, status information, control information, and/or other information between icons. In some embodiments, wires may have different visual appearances which may indicate different characteristics of the wire (e.g., type of data exchange semantics, data transfer protocols, data transfer mediums, and/or type of information passed between the icons, among others).

Graphical Data Flow Program (or Graphical Data Flow Diagram or Data Flow Diagram)—A graphical program or diagram comprising a plurality of interconnected blocks, wherein at least a subset of the connections among the blocks visually indicate that data produced by one block is used by another block. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Various embodiments of a system and method for automatically arranging or positioning objects in a block diagram of a graphical program are described herein. As described in detail below, a graphical programming development environment or other software application may be operable to automatically analyze a block diagram of a graphical program, e.g., in order to determine objects present in the block diagram, as well as their initial positions within the block diagram. The software application may then automatically reposition various ones of the objects in the block diagram. In various embodiments, the objects may be re-positioned so as to better organize the block diagram or enable a user to more easily view or understand the block diagram.

In various embodiments, any kind of software application may implement the automatic arrangement/re-positioning of the objects in the graphical program block diagram. For example, in some embodiments, a graphical programming development environment (e.g., a software application that enables users to develop graphical programs) may implement the automatic arrangement of the objects.

FIG. 1 illustrates an example of a computer system 82 that may execute the graphical programming development environment application (or other software application) that implements the automatic arrangement of objects in a graphical program block diagram. The computer system 82 may include at least one memory medium on which various computer programs, software components, and data structures are stored. In particular, the memory medium may store the graphical programming development environment application, which may be executed by one or more processors of the computer system 82. The memory medium may also store a graphical program. The memory medium may also store operating system software, as well as other software for operation of the computer system.

As described below, the graphical programming development environment may be operable to automatically arrange or position objects within a block diagram of the graphical program. For example, in some embodiments the graphical programming development environment may automatically arrange the objects in the block diagram in response to a user request for the graphical programming development environment to organize the block diagram.

As shown in FIG. 1, the computer system 82 may also include a display device. The block diagram of the graphical program may be displayed on the display device. For example, a plurality of nodes interconnected by lines or wires may be displayed in the block diagram. The plurality of interconnected nodes may visually indicate functionality of the graphical program. After the graphical programming development environment has automatically arranged or re-positioned the objects in the block diagram, the block diagram may appear differently in the display device. For example, one or more of the objects in the block diagram may be located at different positions than where they were initially.

Exemplary Systems

In various embodiments, the graphical program whose block diagram objects are automatically arranged according to the method described herein may be a graphical program operable to perform any of various kinds of functions or associated with any of various kinds of application. For example, in various embodiments the graphical program may perform functions such as test and/or measurement functions; controlling and/or modeling instrumentation or industrial automation hardware; modeling and simulation functions, e.g., modeling or simulating a device or product being developed or tested, etc. Other exemplary test applications where the graphical program may be used include hardware-in-the-loop testing and rapid control prototyping, among others.

However, it is noted that in other embodiments the graphical program may be used for any other type of application and is not limited to the above applications. For example, the graphical program may perform a function such as the control of other types of devices such as multimedia devices, video devices, audio devices, telephony devices, Internet devices, etc., as well as general purpose software applications such as word processing, spreadsheets, network control, network monitoring, financial applications, games, etc.

FIG. 2A illustrates an exemplary instrumentation control system 100. The system 100 comprises a host computer 82 which couples to one or more instruments. The host computer 82 may comprise a CPU, a display screen, memory, and one or more input devices such as a mouse or keyboard as shown. In some embodiments the computer 82 may execute the graphical program, where the graphical program operates with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. In various embodiments the graphical program may be used in a data acquisition and control application, a test and measurement application, an image processing or machine vision application, a process control application, a man-machine interface application, a simulation application, or a hardware-in-the-loop validation application, among others.

Figure 2B:
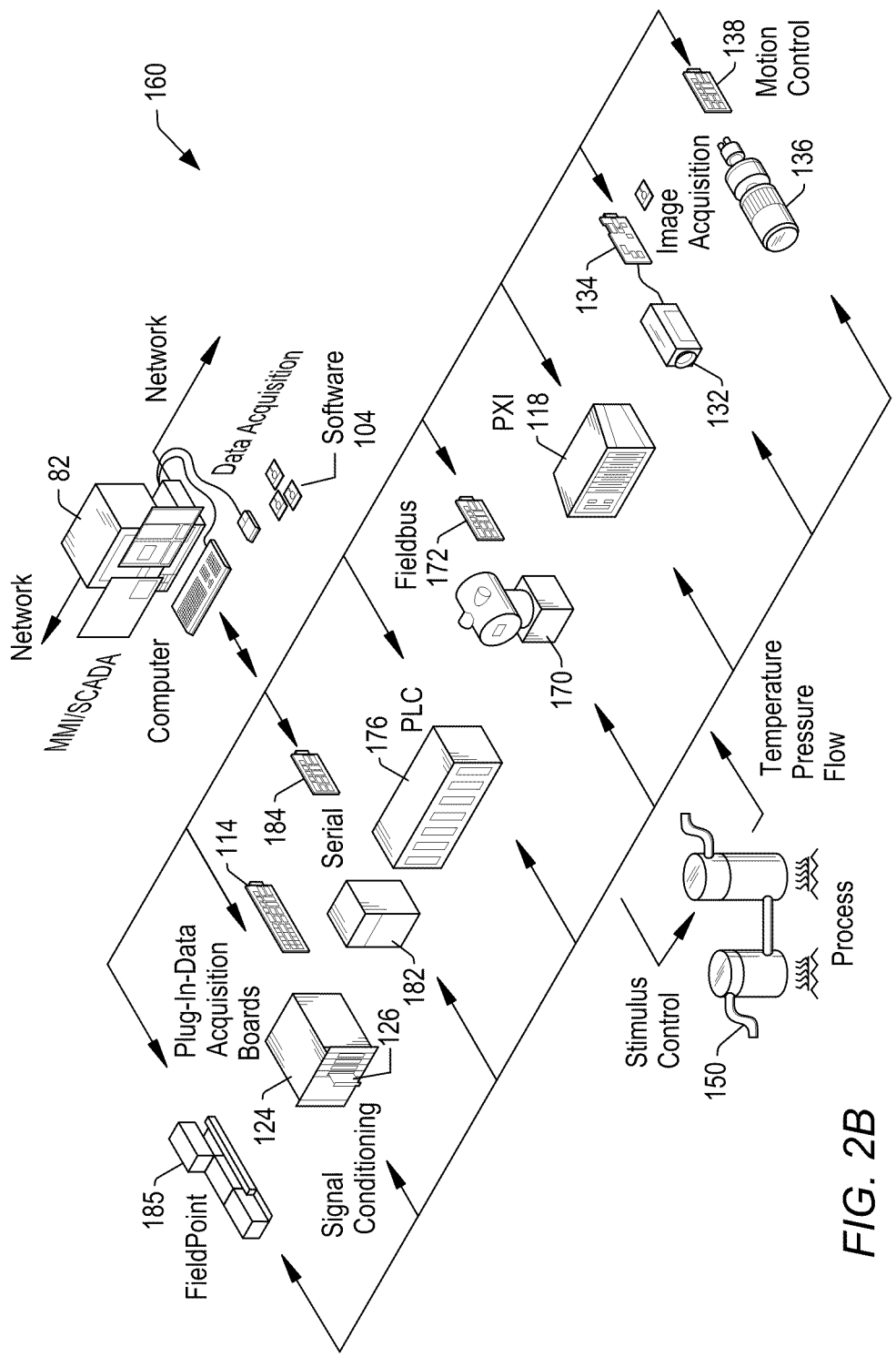
FIG. 2B illustrates an exemplary industrial automation system 160.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. In some embodiments the computer 82 may execute the graphical program, where the graphical program operates with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices. In some embodiments of the systems of FIGS. 2A and 2B, one or more of the various devices may couple to each other over a network, such as the Internet.

Graphical programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
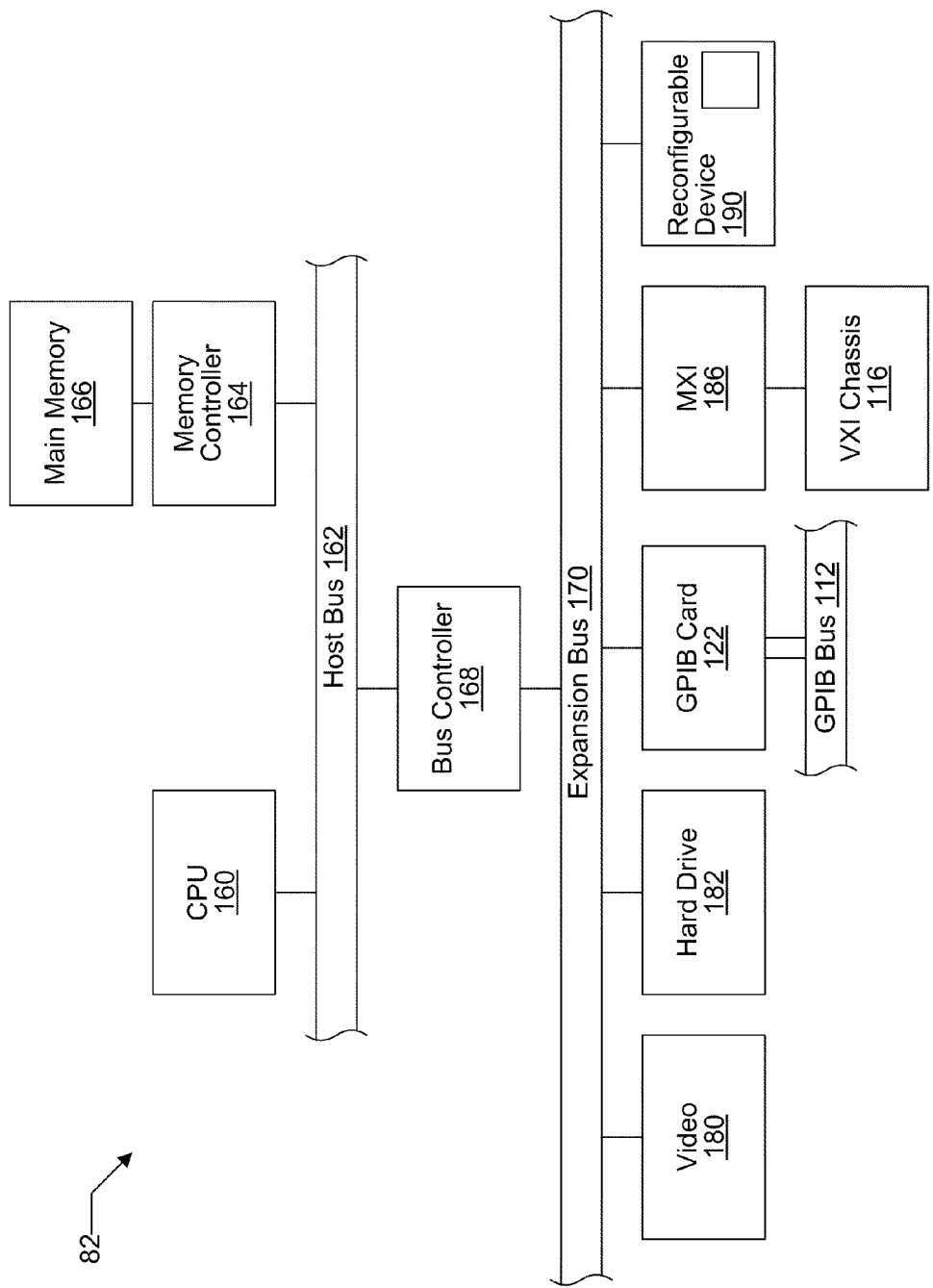
FIG. 3 is a block diagram representing one embodiment of the computer system illustrated in FIGS. 1, 2A, and 2B.

FIG. 3 is a block diagram representing one embodiment of the computer system 82 illustrated in FIGS. 1, 2A, and 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of configurations. Elements of a computer not necessary to understand the present description have been omitted for simplicity.

In this example, the computer system 82 may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory 166, is coupled to the host bus 162 by means of memory controller 164.

The main memory 166 may store the graphical programming development environment and the graphical program, where the graphical programming development environment operates to automatically arrange the objects in the block diagram of the graphical program according to the method described below.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. In some embodiments the computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 4:
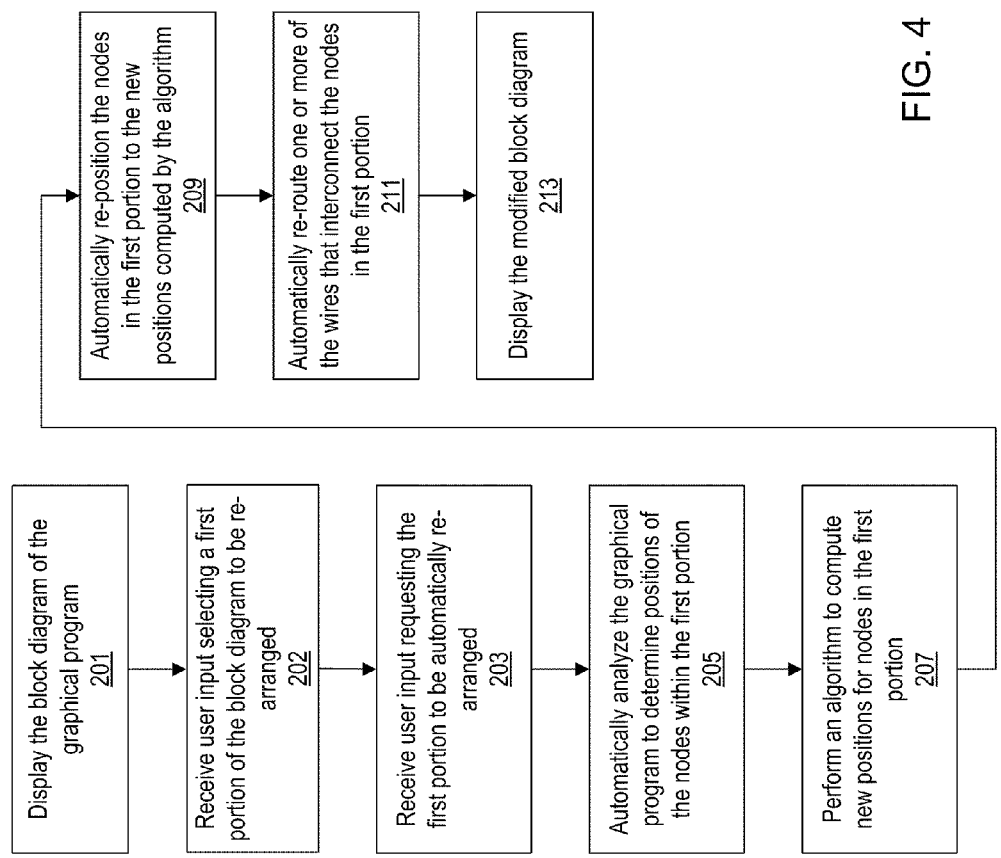
FIG. 4 is a flowchart diagram illustrating one embodiment of a method for automatically organizing a selected portion of a block diagram of a graphical program.

FIG. 4 is a flowchart diagram illustrating one embodiment of a method for automatically organizing a selected portion of a block diagram of a graphical program. The method of FIG. 4 may be implemented by the graphical programming development environment.

As indicated in 201, the block diagram of the graphical program may be displayed, e.g., on the display of the computer 82. For example, the block diagram may display various nodes which the user has included in the graphical program, as well as wires the user has created to connect the nodes.

For various reasons, some portions of the block diagram of the graphical program may not be organized particularly well. For example, as the user creates the graphical program, the user does not always know exactly which nodes will be present in the block diagram and how these nodes will be positioned when the graphical program is complete, since creating the graphical program may be something of an experimental or iterative process. Thus, for example, the user may find that he needs to insert a node in a place where he originally did not anticipate a node being located. Even if the user does know exactly which nodes will be present in the completed program, the user still may not want to take the time to align and space the nodes with respect to each other in order to form an aesthetically pleasing block diagram.

Thus, the graphical programming development environment may be operable to automatically organize the block diagram for the user, e.g., by re-arranging items in the block diagram. However, the user may not want the entire block diagram to be re-arranged. For example, most of the block diagram may already be arranged as the user wants, and the user may only want a particular portion of the block diagram to be re-arranged by the graphical programming development environment. As indicated in 202, the user may provide user input selecting a particular portion (e.g., a "first portion") of the block diagram which he desires to be automatically re-arranged. In various embodiments the user may select the first portion of the block diagram using any of various techniques. As one example, the user may draw a rectangle or other type of border around the desired portion of the block diagram to be re-arranged, e.g., using a mouse or other pointing device. As another example, the user may select one or more objects in the graphical program to include within the first portion. For example, the user may select a particular While Loop object to be re-arranged. In this example, the While Loop object may have a border or sub-diagram in which interconnected nodes are displayed. Thus, selecting the While Loop object for inclusion in the first portion may indicate that the user desires the nodes within the While Loop object to be re-arranged.

The graphical programming development environment may graphically indicate to the user that the first portion of the block diagram has been selected, e.g., by displaying a box or border around the nodes and other objects of the first portion, by changing the appearance of the objects in the first portion, or using any of various other graphical techniques to indicate the selection.

In 203, the graphical programming development environment may then receive user input requesting the selected first portion of the block diagram to be automatically re-arranged. For example, the user may select a menu item or provide other input to request the graphical programming development environment to automatically organize or re-arrange the selected first portion of the block diagram.

In response, the graphical programming development environment may automatically analyze the graphical program to determine positions of the nodes within the first portion of the block diagram, as indicated in 205. For example, the graphical programming development environment may traverse data structures representing the graphical program to determine which nodes and other objects are present in the first portion, determine how these nodes are connected to each other, determine the original positions of the nodes (e.g., where they are originally located in the block diagram), etc.

In 207, the graphical programming development environment may perform an algorithm to compute new positions for the nodes in the first portion of the block diagram, e.g., based on the information obtained when the graphical program is analyzed in 205. In various embodiments the graphical programming development environment may use any kind of algorithm to compute the new positions.

In 209 the graphical programming development environment may automatically re-position the nodes in the first portion of the block diagram to the new positions computed by the algorithm. Thus, the nodes included in the first portion may be re-positioned or rearranged within the block diagram without the user providing input to manually move the nodes. Also, as indicated in 211, one or more of the wires that interconnect the nodes of the first portion may be automatically re-arranged (e.g., re-routed) to reflect the new positions of the nodes.

As indicated in 213, the graphical programming development environment may display the modified block diagram. Since the first portion of the block diagram has been re-arranged, the nodes included in the first portion of the block diagram may be displayed at new positions relative to each other. Block diagram nodes that are not in the first portion may be displayed at the same positions relative to each other as they were before the first portion of the block diagram was re-arranged. However, one or more nodes that are not in the first portion may have different absolute positions after the first portion is re-arranged. For example, suppose that there are several nodes to the right of the first portion. In some embodiments the nodes located to the right of the first portion may all be shifted rightward or leftward by a particular amount. However, they preferably still have the same overall visual layout since their positions relative to each other have not changed. It is noted that, as used herein, saying that a given portion of the block diagram is not re-arranged means that nodes within the given portion retain the same positions relative to each other.

Similarly, wires that connect nodes included in the first portion of the block diagram may be re-displayed to reflect new routing between the nodes of the first portion of the block diagram. Other wires of the block diagram (e.g., wires that connect nodes that are not in the selected first portion of the block diagram) may have the same appearance as before the first portion of the block diagram was re-arranged.

In some embodiments the window which displays the original block diagram may be updated after the objects in the first portion of the block diagram have been re-positioned, e.g., so that the modified block diagram replaces the original block diagram. In other embodiments the modified block diagram may be displayed in a new window.

In other embodiments the modified block diagram may not be immediately displayed all at once. Instead the graphical programming development environment may be operable to display animations so that the user can see how various objects in the graphical program have been re-positioned. For example, where a node is re-positioned to a new location, the graphical programming development environment may display an animation of the node moving from its original location to the new location.

In various embodiments the block diagram organization algorithm may re-position nodes in the first portion of the block diagram in order to achieve any of various goals and according to any of various constraints. The nodes of the selected first portion are preferably re-positioned and the wires connecting them are preferably routed in such a way that an aesthetically pleasing block diagram that is easy for the user to view and understand is achieved. For example, nodes may be aligned with each other in various ways. Also, nodes may be distributed so that there is sufficient space between them, but yet so that space is not wasted, and the resulting block diagram is compact so that the user can view a lot of information at once. Wires may be routed so that the number of wire crossings is minimized, and wire bends are positioned in such a way that the diagram does not appear cluttered.

In some embodiments the graphical program may be a graphical data flow program, e.g., a graphical program which visually indicates data flow among the nodes. For example, a wire between two nodes may indicate that output data produced by one node is passed as input data to the other node. In some embodiments the first portion of the block diagram may be automatically organized so that left-to-right data flow semantics is obeyed. For example, if one node produces data that is passed as input to another node, the first node may be positioned to the left of the second node. Thus, it may be easily seen that data flows from left to right along each wire in the first portion of the block diagram.

Figure 5:
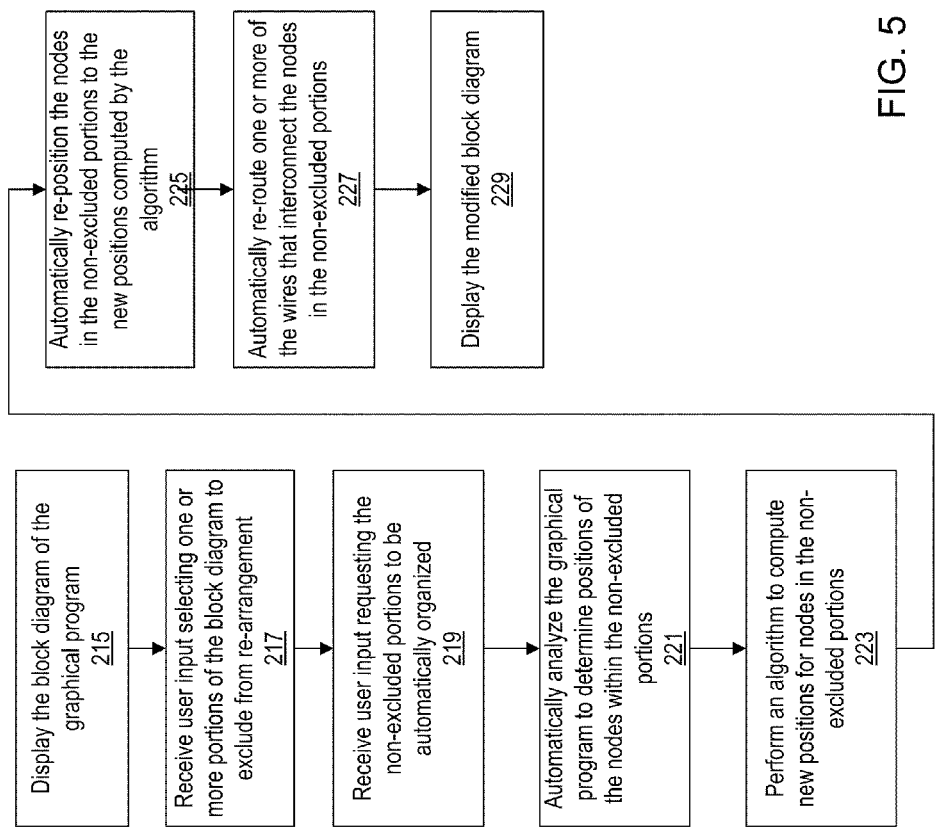
FIG. 5 is a flowchart diagram illustrating one embodiment of a method for excluding a portion of a block diagram of a graphical program from being re-arranged.

In other embodiments, instead of selecting a first portion of the graphical program to be re-arranged, the user may instead select one or more portions of the block diagram to exclude from re-arrangement. The graphical programming development environment may then re-arrange the block diagram without re-arranging the nodes and other objects located in the excluded portion(s) of the block diagram. FIG. 5 is a flowchart illustrating one such embodiment.

In 215 the graphical programming development environment may display the block diagram of the graphical program.

In 217 the graphical programming development environment may receive user input selecting one or more portions of the block diagram to exclude from re-arrangement. In various embodiments the user may select the excluded portions in any of various ways. As one example, the user may draw one or more rectangles or other type of borders around the portion(s) of the block diagram which the user desired to not be re-arranged. As another example, the user may a particular object from re-arrangement, e.g., by clicking on the object or using a menu item associated with the object. For example, the user may select a particular While Loop object to exclude from re-arrangement. In this example, the While Loop object may have a border or sub-diagram in which interconnected nodes are displayed. Thus, selecting the While Loop object for exclusion may indicate that the user desires the nodes within the While Loop object to remain at their same positions relative to each other.

In 219 the graphical programming development environment may receive user input requesting the non-excluded portions to be automatically organized. The graphical programming development environment may then automatically analyze the graphical program to determine the positions of the nodes within the non-excluded portions, as indicated in 221. The graphical programming development environment may then perform an algorithm to compute new positions for the nodes in the non-excluded portions, as indicated in 223. The graphical programming development environment may then automatically re-position the nodes in the non-excluded portions to the new positions computed by the algorithm, as indicated in 225. The graphical programming development environment may also automatically re-route one or more of the wires that interconnect the nodes in the non-excluded portions, as indicated in 227.

As shown in 229, the graphical programming development environment may then display the modified block diagram. The nodes in the portion of the block diagram which the user excluded from re-arrangement may be displayed in the same relative positions to each other, whereas the nodes in the other non-excluded portions of the block diagram may have been re-positioned with respect to each other.

The following use cases illustrate example uses of the methods of FIGS. 4 and 5.

Use Case 1—Fixing Contents of a Structure and Invoking Diagram Cleanup

Figure 6:
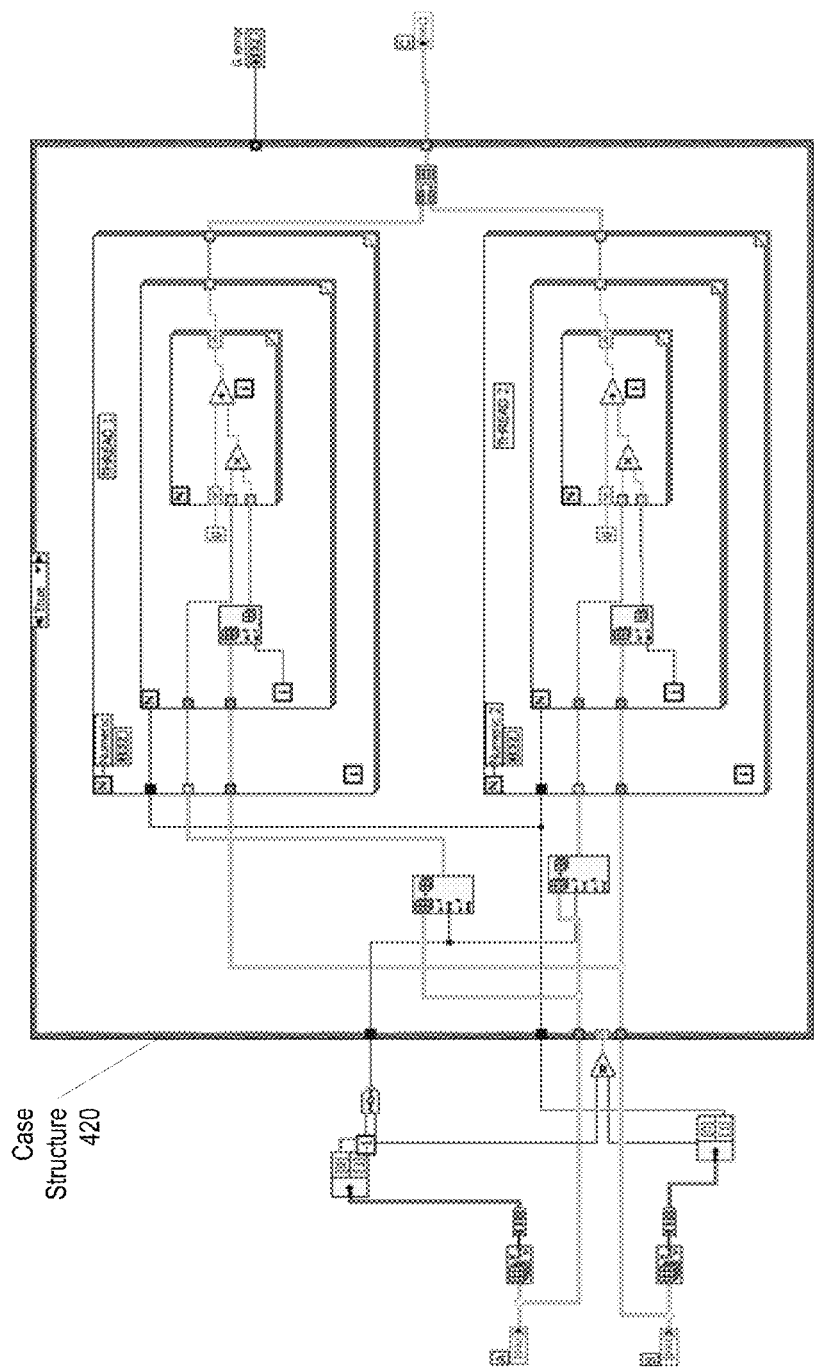
FIGS. 6-22 illustrate examples of re-arranging various portions of graphical programs according to the methods of FIGS. 4 and 5.
Figure 7:
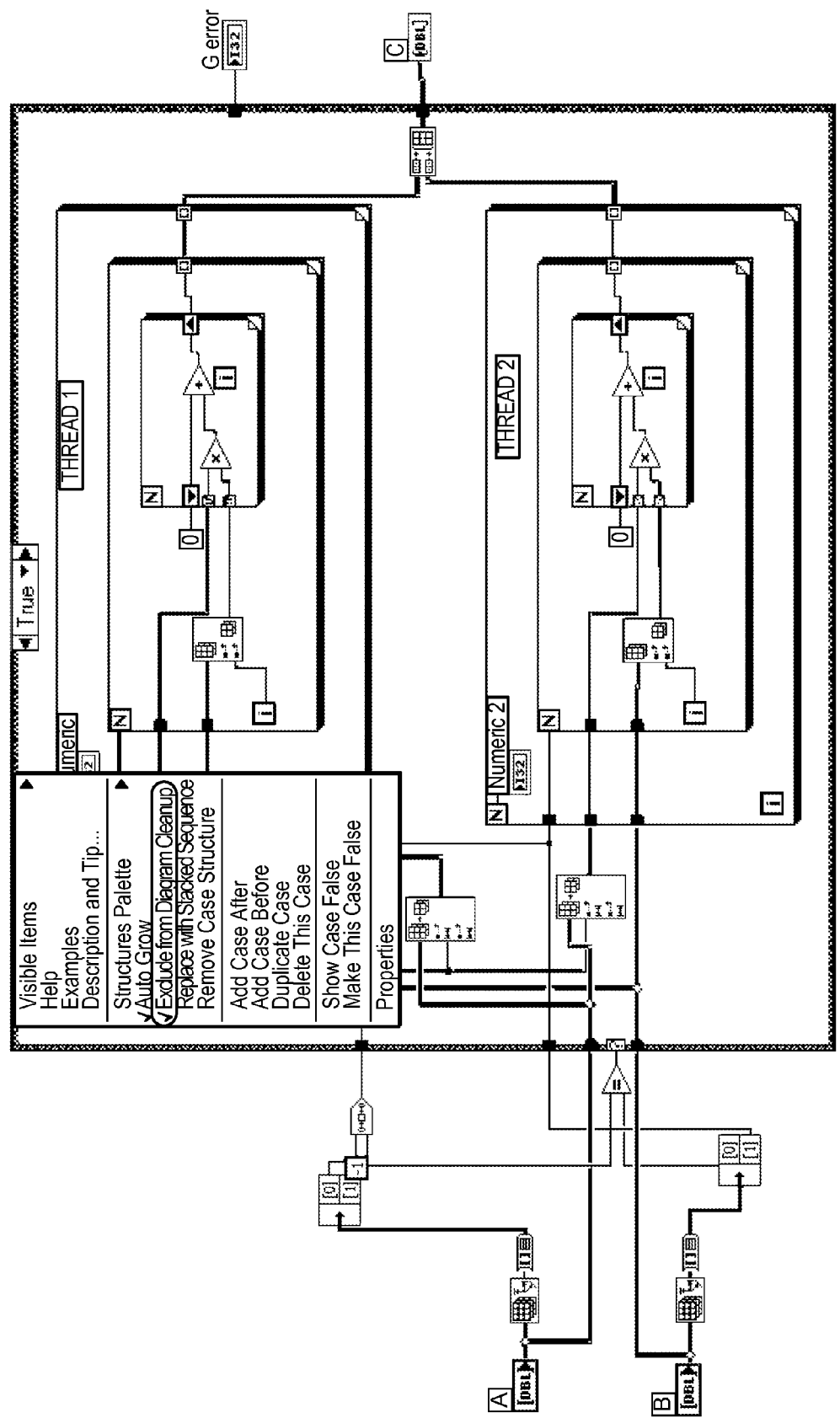
Figure 8:
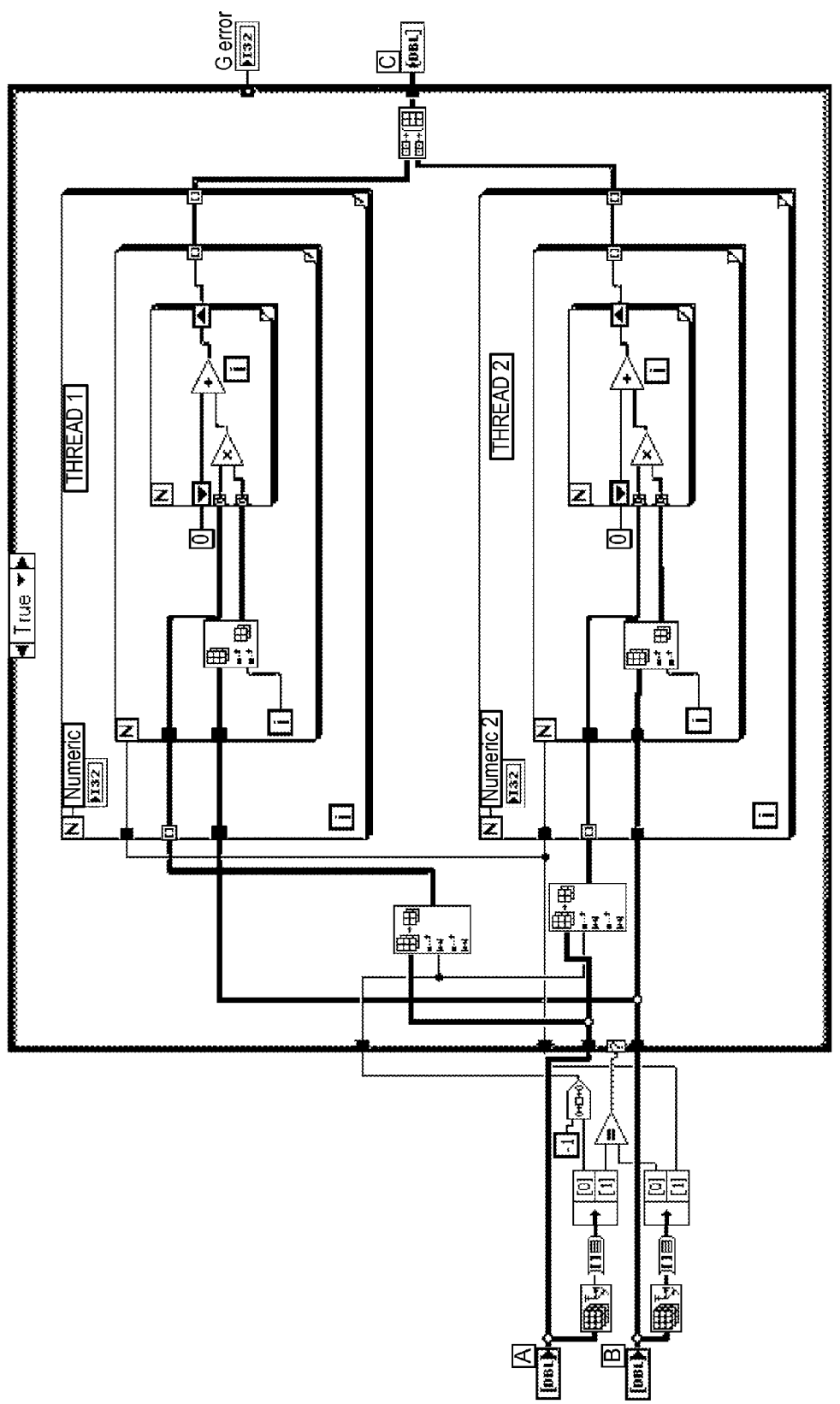
Figure 9:
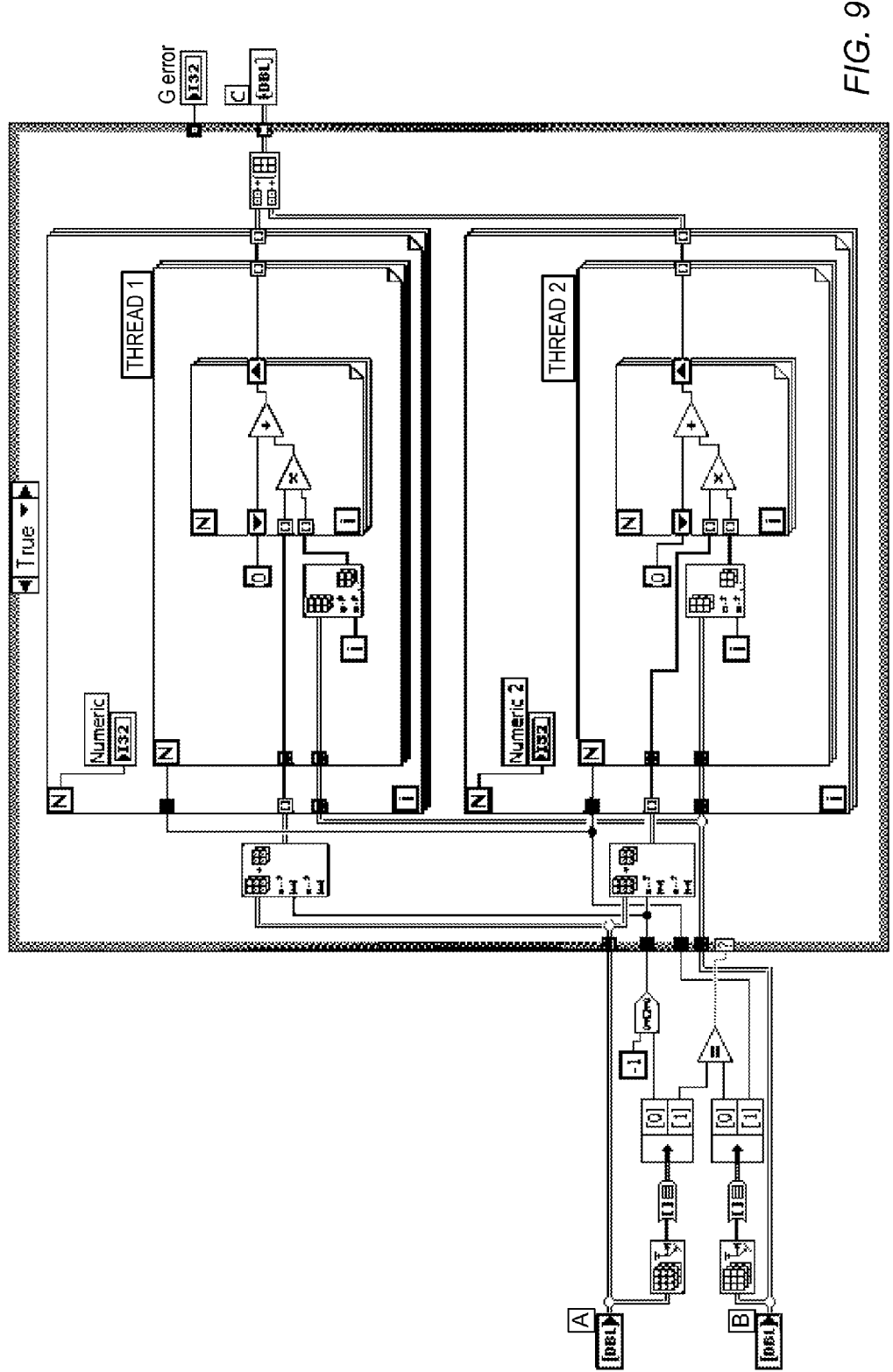

FIG. 6 illustrates an example of an original graphical program before it has been automatically re-arranged by the graphical programming development environment. The graphical program includes a Case Structure object which has a border surrounding other nodes and structures. As shown in FIG. 7 that user can exclude the Case Structure object from re-arrangement. In this example the user excludes the Case Structure object by invoking a context menu associated with the Case Structure object and then selecting the "Exclude from Diagram Cleanup" option from the menu. The user may then invoke a function to re-arrange or cleanup the graphical program. The entire graphical program except for the part within the Case Structure object will be automatically re-arranged by the graphical programming development environment. The resulting modified graphical program is shown in FIG. 8. As shown, the nodes and objects within the Case Structure object have the same relative positions as in the original diagram—i.e., these nodes have not been re-arranged. Other nodes outside the Case Structure object have been re-arranged. FIG. 9 illustrates how the graphical program would appear if the user had not excluded the Case Structure object before invoking the cleanup feature. As shown, the inner contents of the Case Structure object have been re-arranged relative to their initial layout.

It is noted that in some embodiments the user may select more than one object or structure for exclusion from re-arrangement. The graphical programming development environment may treat all structures marked for exclusion as "black boxes" with respect to re-arrangement so that their size and internal contents' positions will not change. The structure as a whole may be re-positioned however, e.g., by shifting it up or down and left or right.

Use Case 2—Cases when Re-Arrangement is not Done

Figure 10:
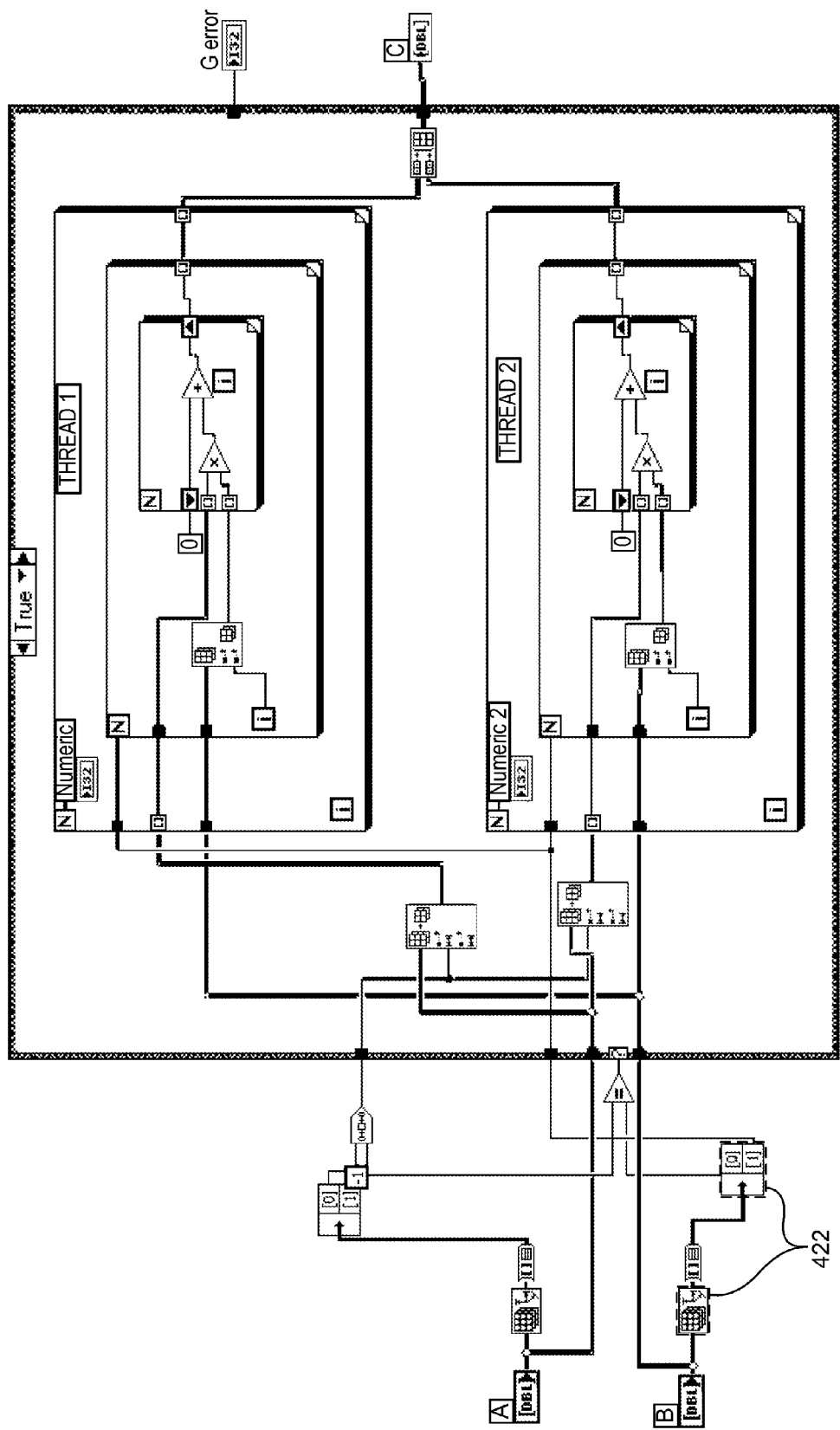

In some embodiments, when only non-overlapping blocks (no structures) are selected and nothing else, and the user invokes the re-arrangement feature, the graphical programming development environment may do nothing. In other words, no re-arrangement is done, and the selected portion of the graphical program remains selected. Consider the example graphical program of FIG. 10. Two nodes 422 have been selected by the user. The two selected nodes do not overlap with any other nodes and are not also not directly connected to each other. Thus, if the user invokes the re-arrangement feature with this selection, the graphical programming development environment may do nothing.

Figure 11:
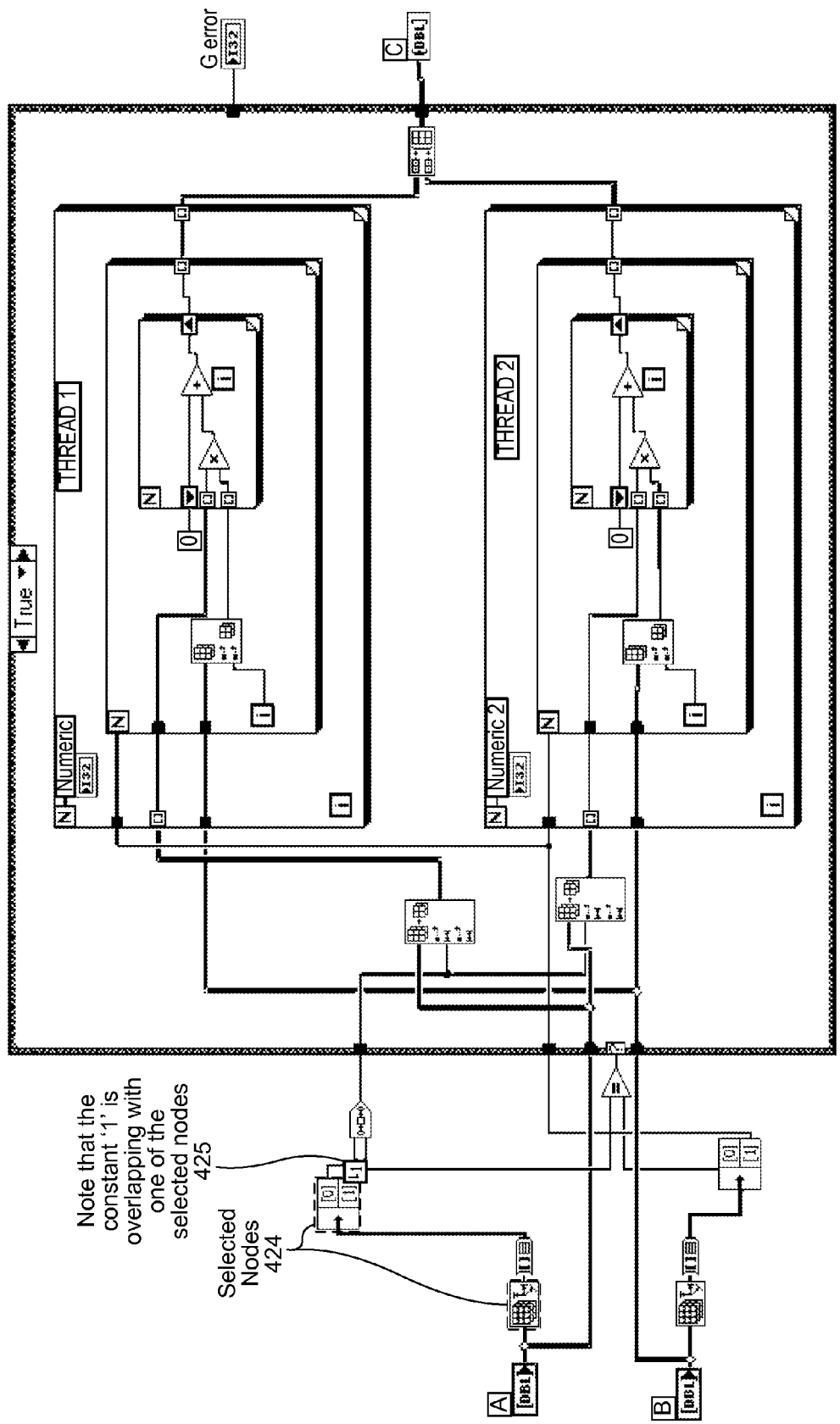

FIG. 11 illustrates another example in which two nodes 424 have been selected by the user. Again the two selected nodes are not directly connected to each other. However, a constant block 425 overlaps one of the selected nodes. Thus, the graphical programming development environment would perform the re-arrangement algorithm if the user invokes the re-arrangement feature in this example. The re-arrangement algorithm may result in the overlap problem being removed from the diagram.

Figure 12:
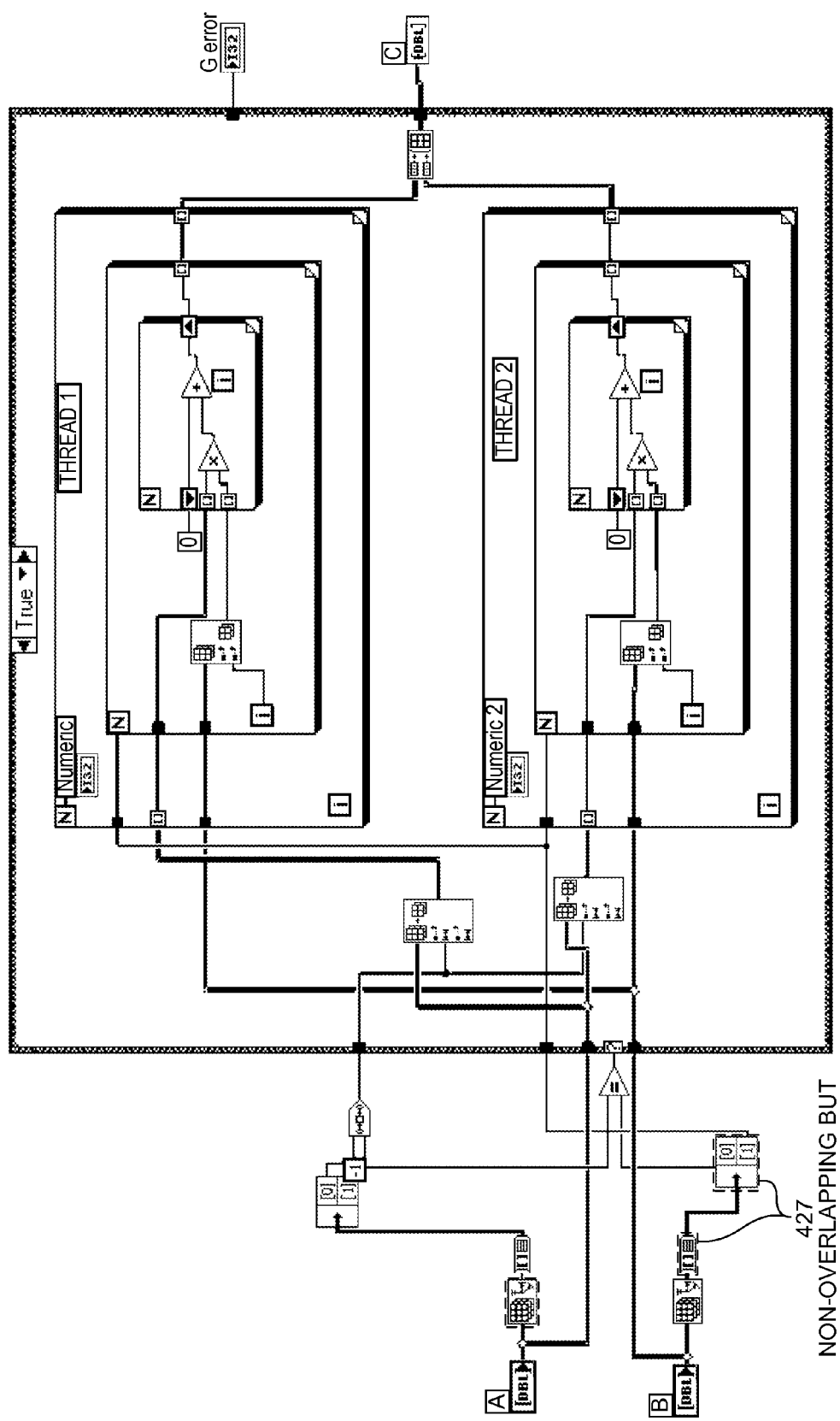

FIG. 12 illustrates another example in which two nodes 427 have been selected by the user. The two selected nodes do not overlap, but they are directly connected to each other. Thus, the graphical programming development environment would perform the re-arrangement algorithm if the user invokes the re-arrangement feature in this example. The re-arrangement algorithm may result in the two connected nodes being laid out in a hierarchical manner.

Use Case 3—Cleaning Up Only a Structure

In some embodiments the user may select a Structure object and nothing else, and then invoke the re-arrangement feature. The graphical programming development environment may re-arrange the inner contents of the Structure object (including the tunnels and shift-registers) and re-size the structure. In some embodiments this re-arrangement may be done even if the user previously marked the Structure object for exclusion from re-arrangement. If the size of the Structure object is changed by the re-arrangement algorithm, the graphical programming development environment may shift nodes and other objects outside the Structure object accordingly to reflect the increased or decreased size of the Structure object.

Figure 13:
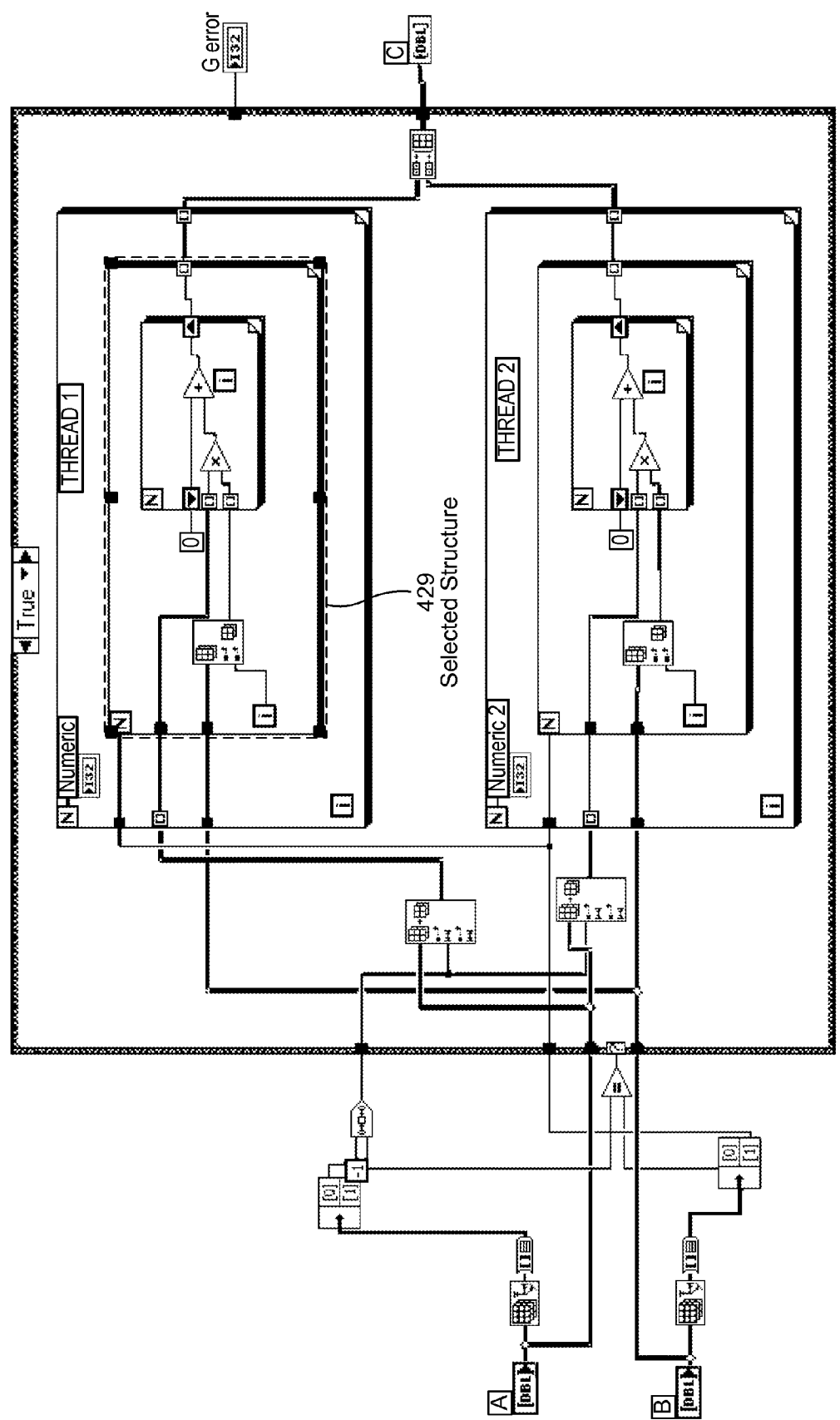
Figure 14:
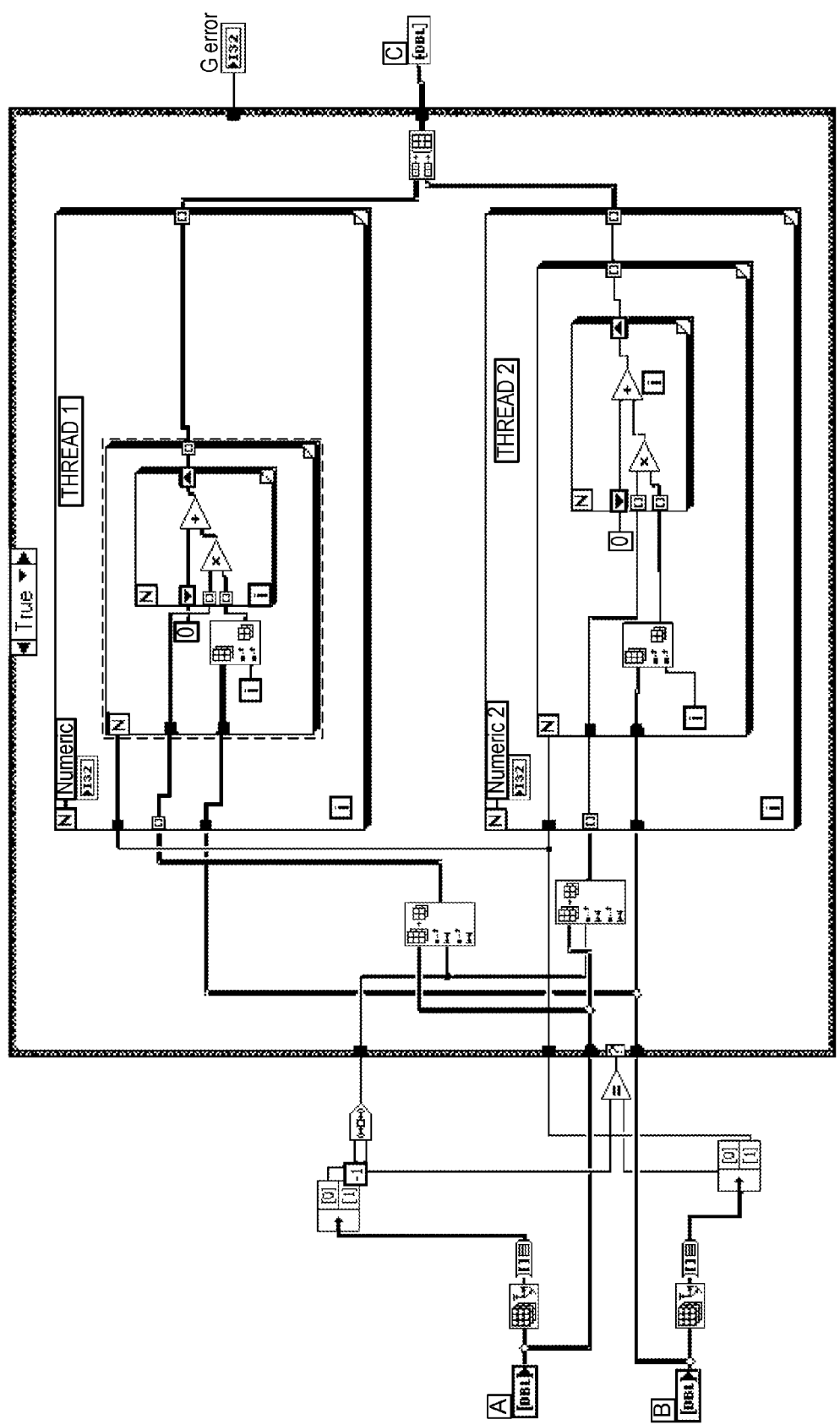

FIG. 13 illustrates an example graphical program in which the user has selected only a Structure object 429. FIG. 14 illustrates the modified graphical program after the user has invoked the re-arrangement feature on the Structure object 429. As shown, the size of the Structure object 429 has changed, and the inner contents of the Structure object 429 have been re-arranged. Other portions of the graphical program remain the same.

Figure 15:
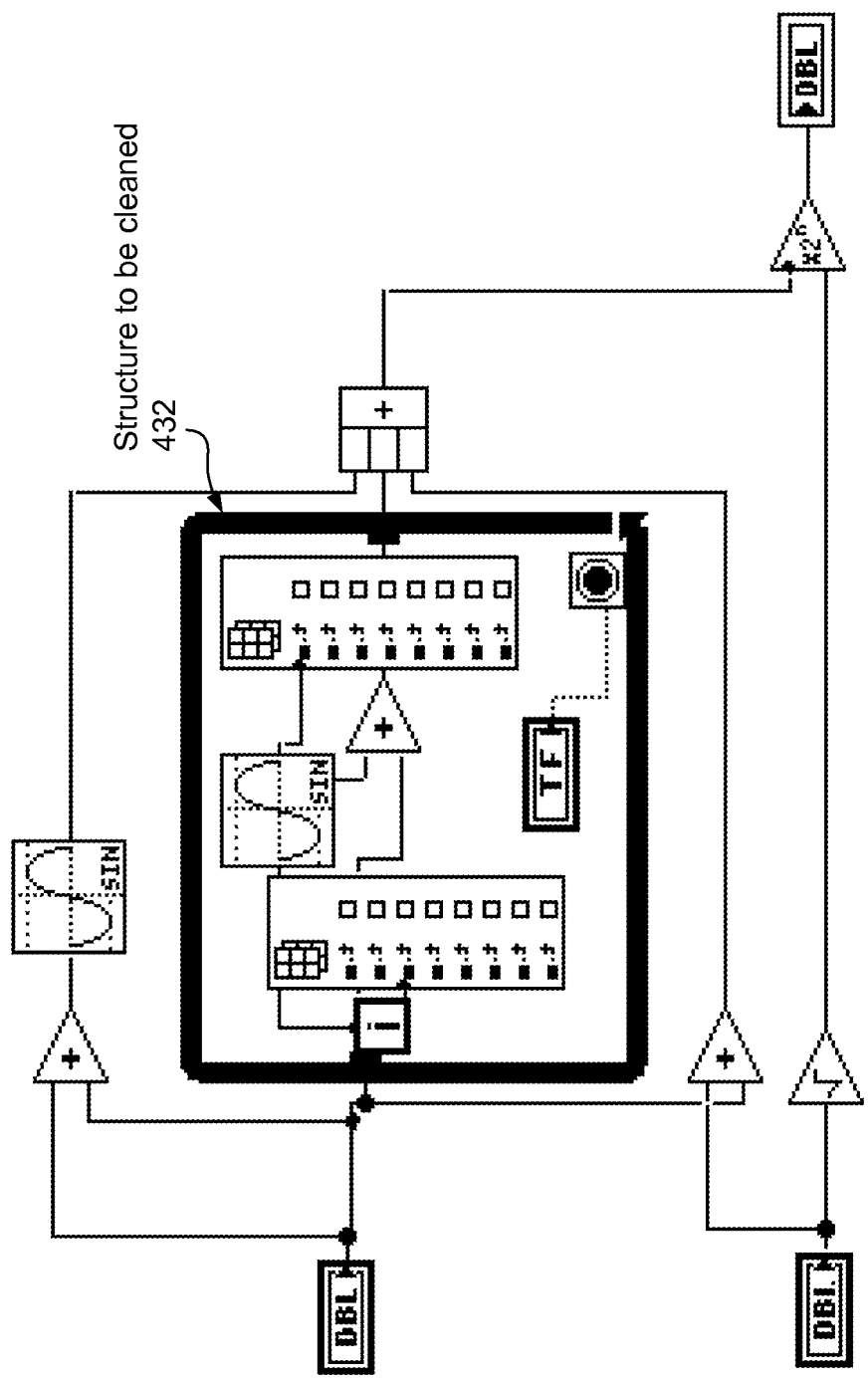
Figure 16:
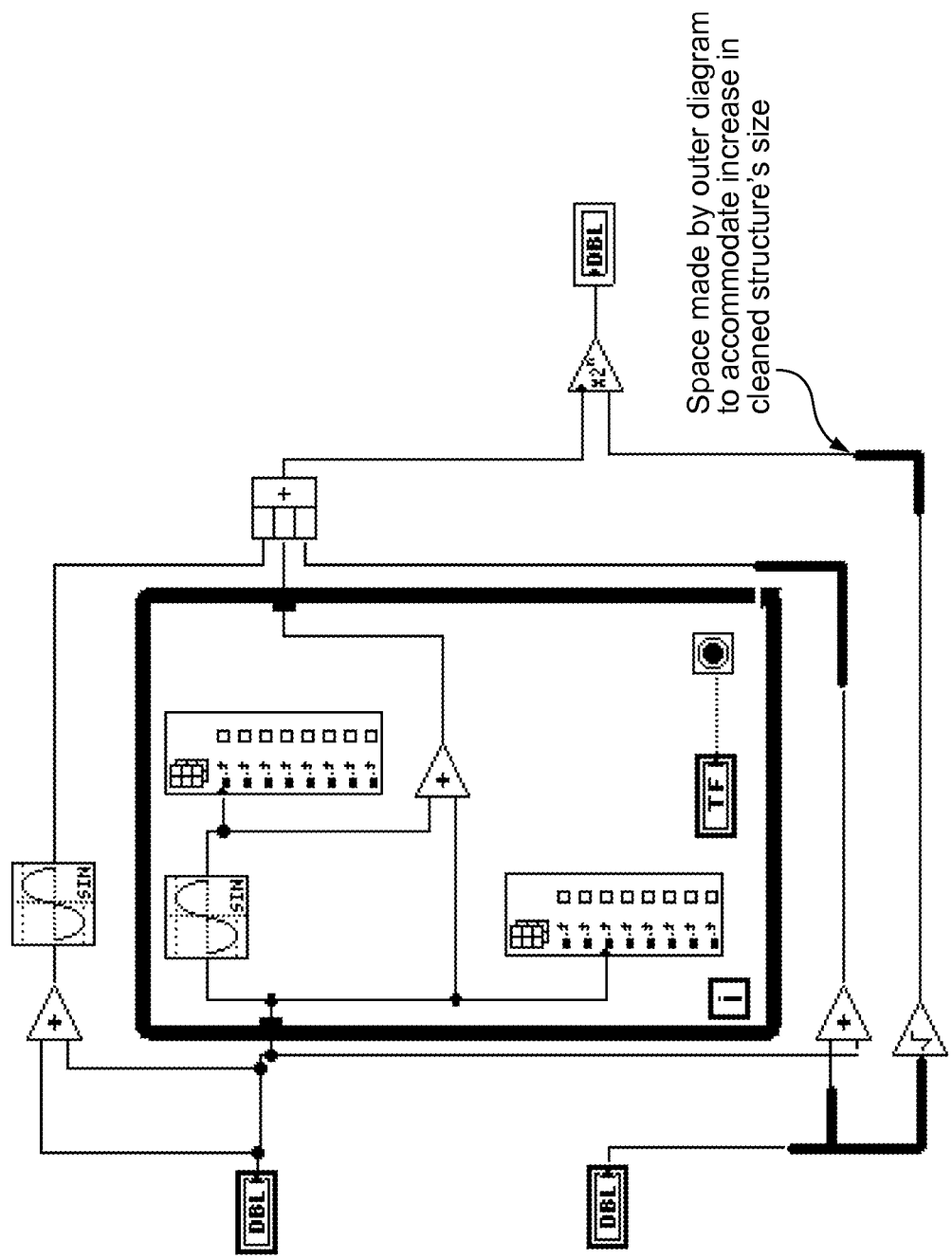

FIG. 15 illustrates another example graphical program in which the user has selected only a Structure object 432. FIG. 16 illustrates the modified graphical program after the user has invoked the re-arrangement feature on the Structure object 432. As shown, the size of the Structure object 432 has changed, and the inner contents of the Structure object 432 have been re-arranged. Positions of other objects outside the Structure object 432 have also been shifted to accommodate the increased height of the Structure object 432, but otherwise remain in the same relative positions to each other.

Use Case 4—Cleanup of Simple Rectangular Selection

In some embodiments the user may select a region in the graphical program such that all the objects within the region are selected. For example, the user may use a mouse to drag a selection box around the entire region. The user may then invoke the re-arrangement feature. The graphical programming development environment will re-arrange the selected region and leave other parts of the graphical program unchanged other than possibly making space if the newly re-arranged region has increased space requirements. If the region includes any Structure objects which the user previously marked for exclusion from re-arrangement then the inner contents of the excluded Structure objects may remain unchanged.

Figure 17:
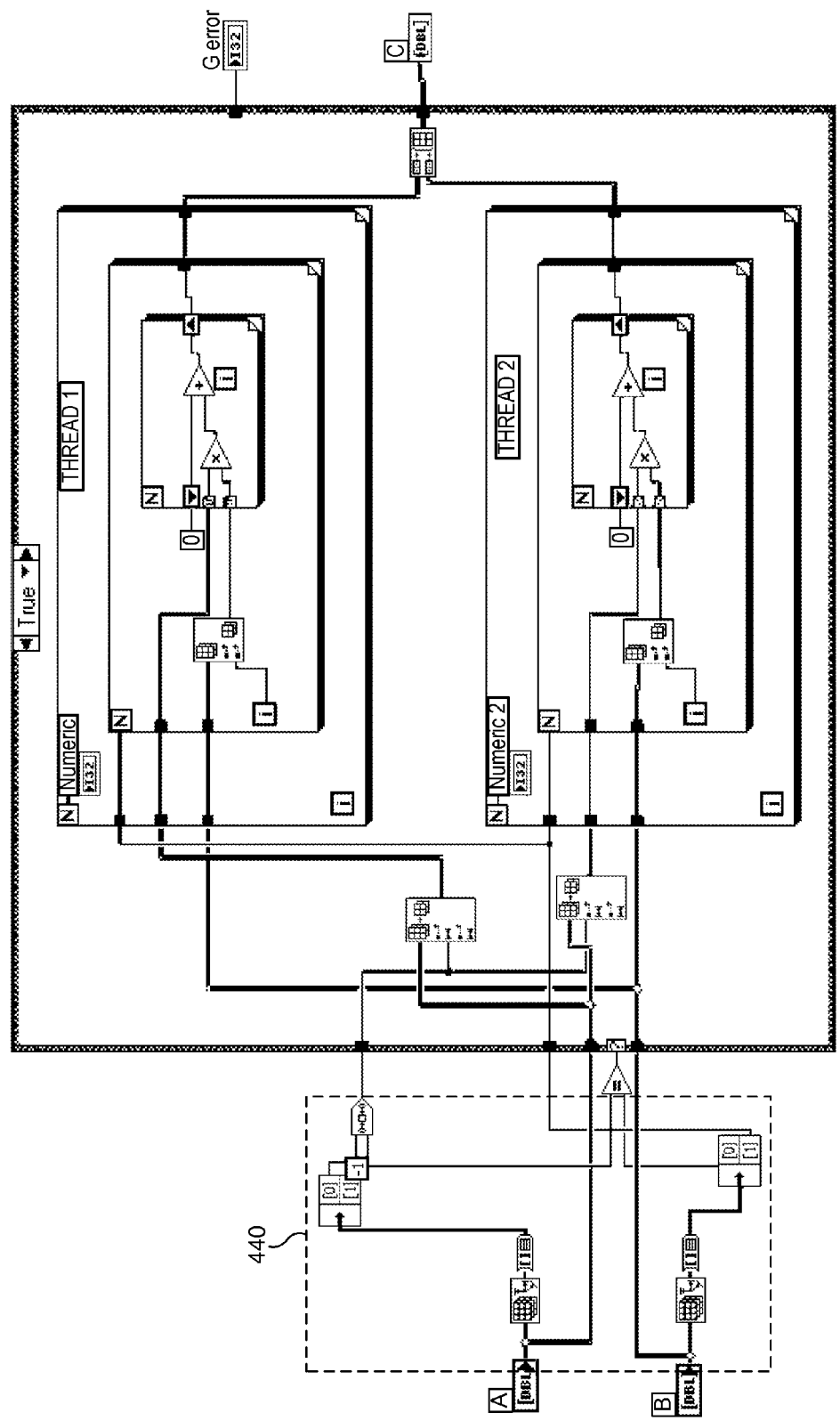
Figure 18:
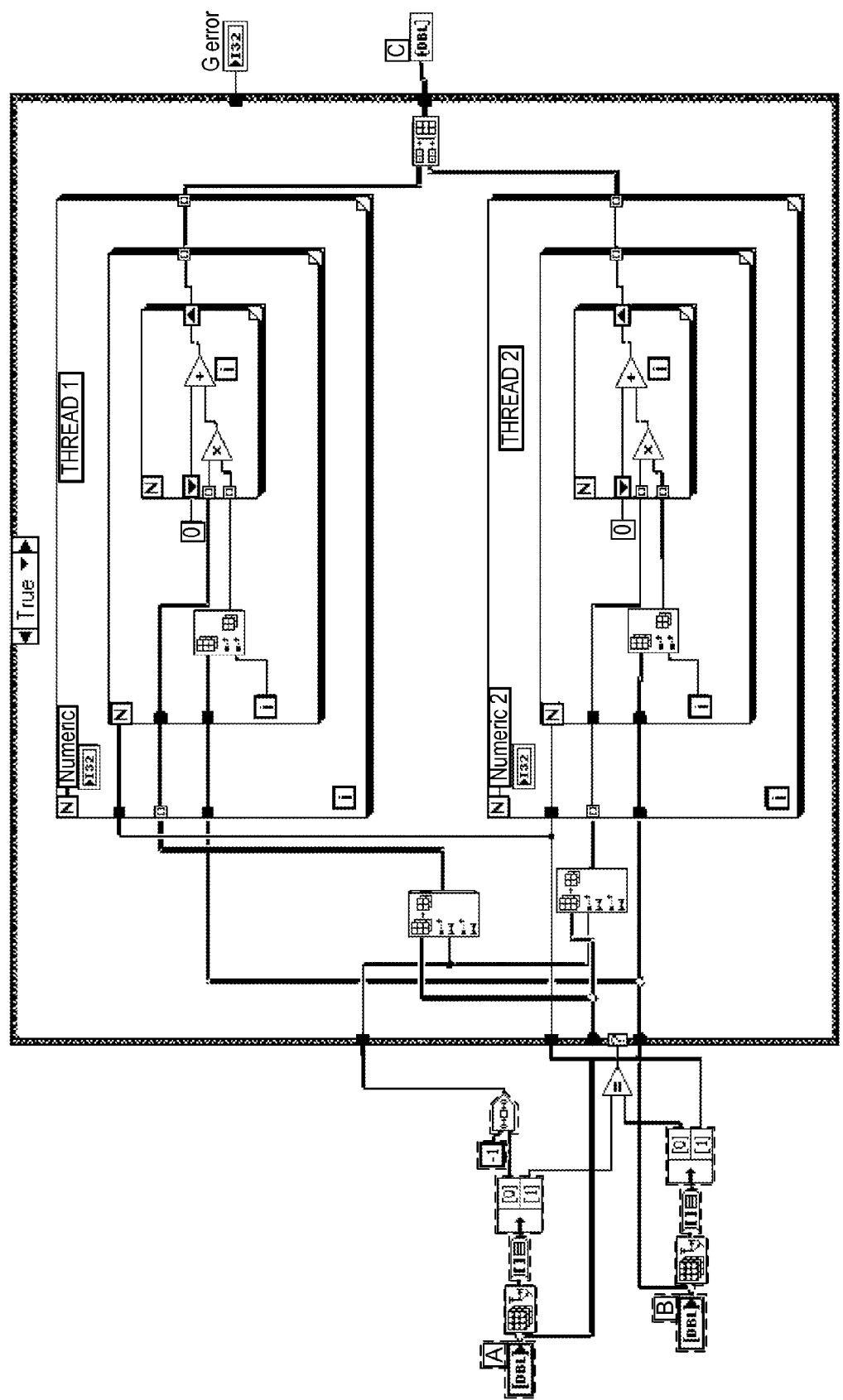

FIG. 17 illustrates an example graphical program in which the user has selected a rectangular region 440. FIG. 18 illustrates the modified graphical program after the user has invoked the re-arrangement feature on the selected region 440. The contents of the selected region 440 have been re-arranged, and the rest of the graphical program remains unchanged.

Use Case 5—Cleanup of Multiple Non-Overlapping Rectangular Selections

In some embodiments the user may select non-overlapping regions of the graphical program. For example, the user can select one region and then select another region while holding the Shift key down so that both regions are then selected at the same time. The user may then invoke the re-arrangement feature. In response, the graphical programming development environment may re-arrange each of the selected regions.

Figure 19:
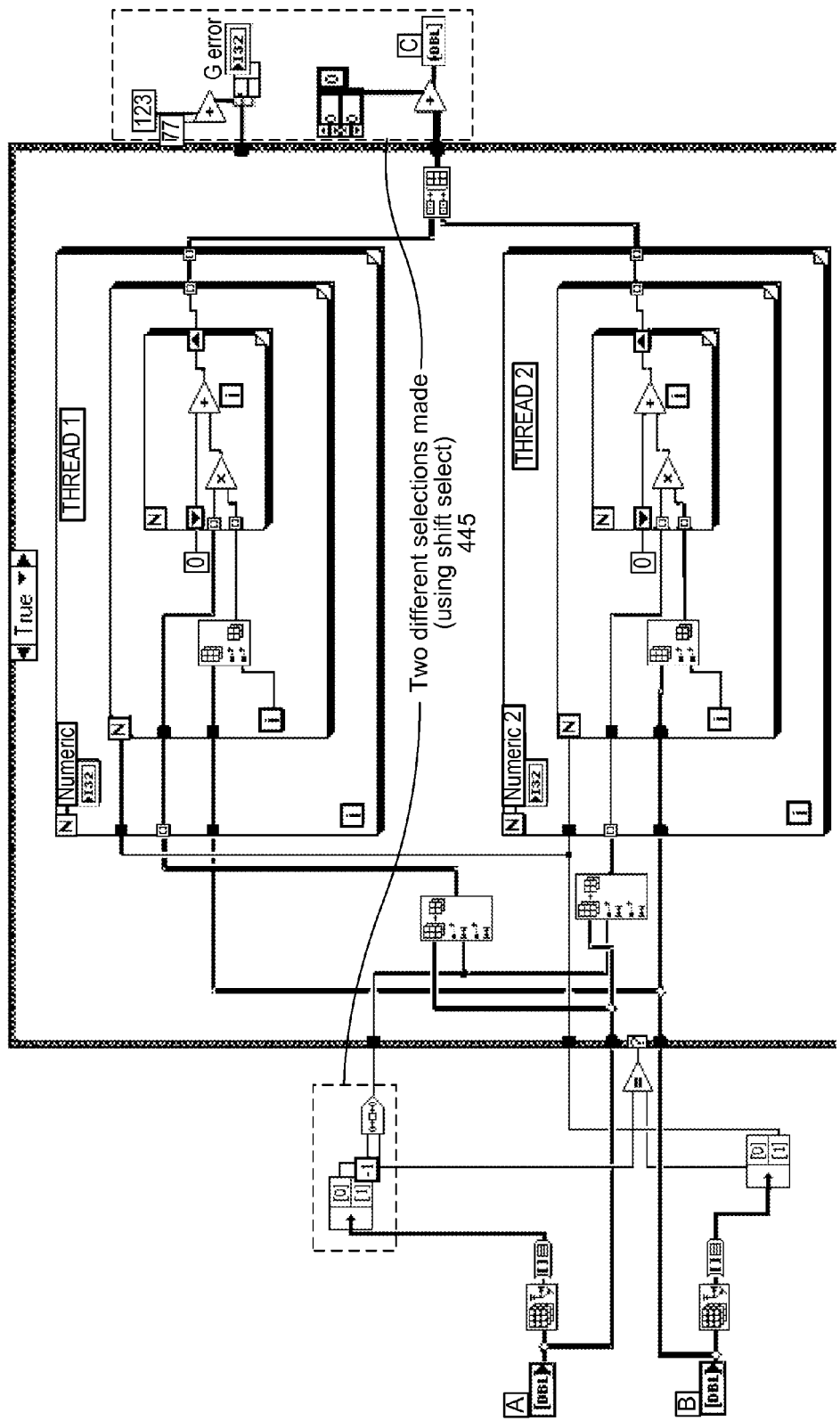
Figure 20:
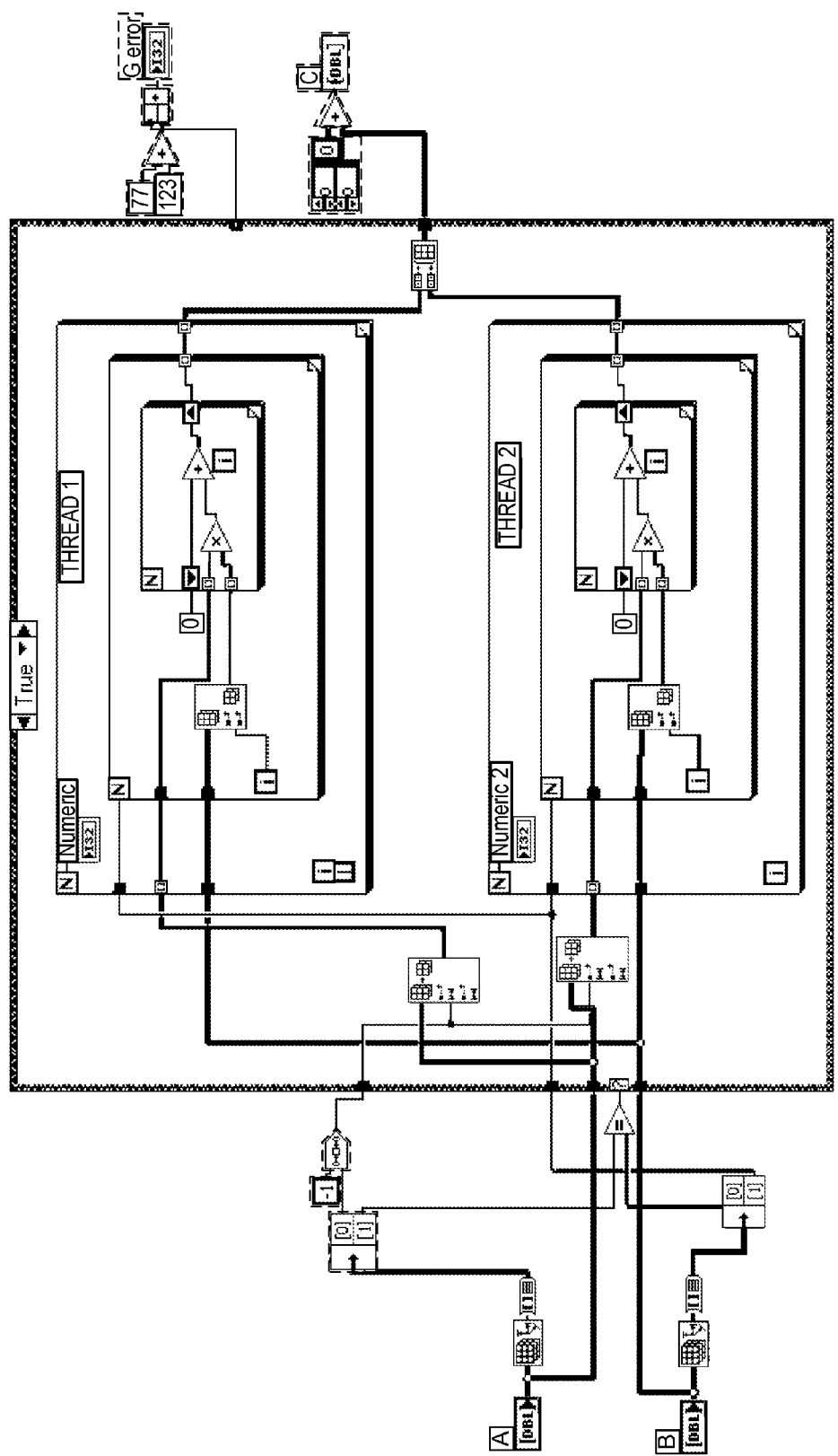

FIG. 19 illustrates an example graphical program in which the user has selected two rectangular regions 445. FIG. 20 illustrates the modified graphical program after the user has invoked the re-arrangement feature on the selection. The contents of the selected regions 445 have been re-arranged, and the rest of the graphical program remains unchanged.

Use Case 6—Cleanup of a Selection Spanning a Structure Boundary

In some embodiments the user may select an entire region in the graphical program (e.g., using a mouse to drag a rectangle) such that the selection crosses a boundary of a Structure object. The user may then invoke the re-arrangement feature. The graphical programming development environment may create rectangular selections inside each Structure and separately perform the re-arrangement algorithm on each of them. The graphical programming development environment may select extra blocks to create these rectangular selections. If a Structure object's internal contents are selected (not the whole Structure itself), then the exclusion status of the Structure object is not considered. The order in which the selections are re-arranged may be from selections within inner-most nested structure to outer.

Figure 21:
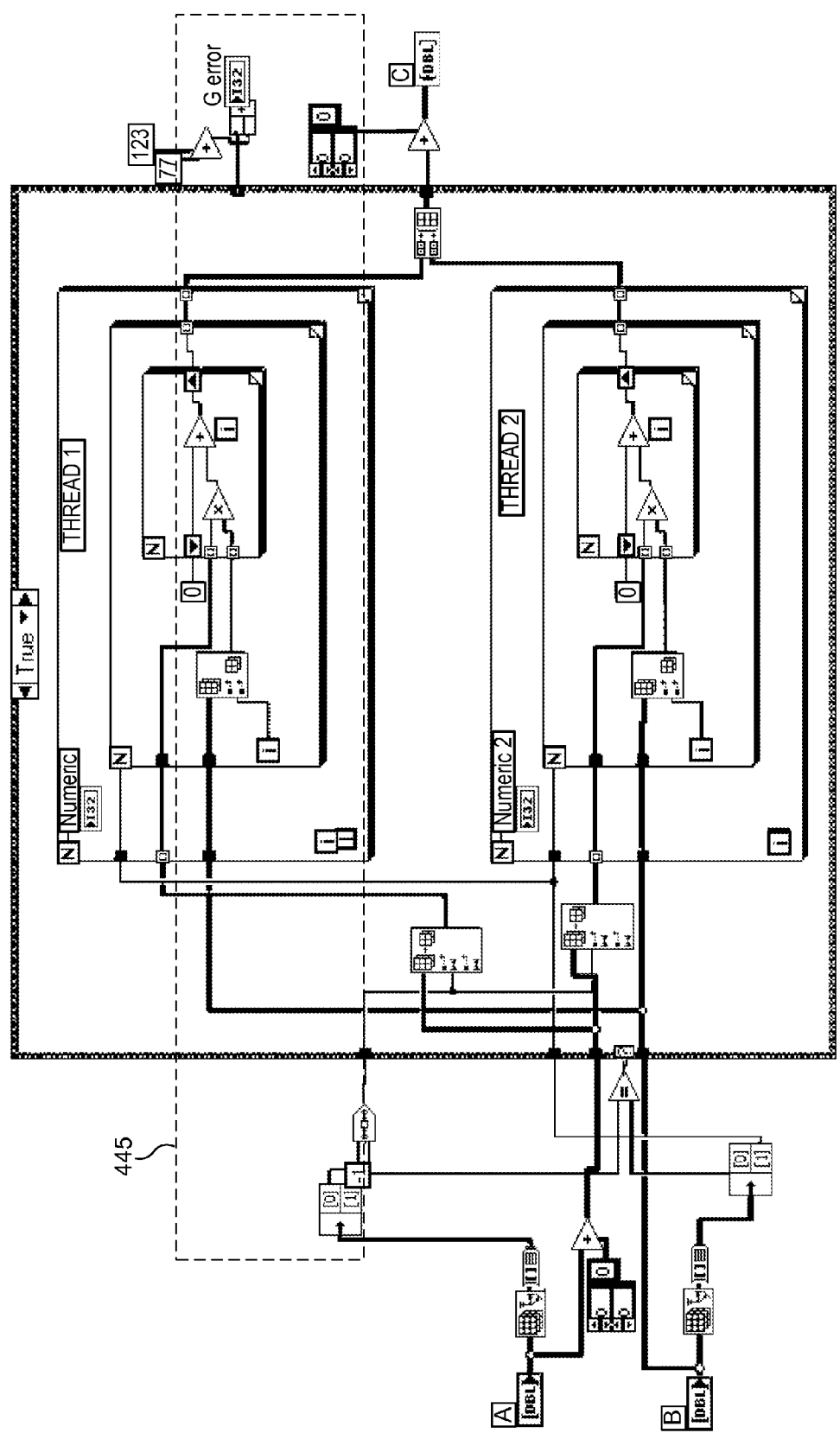
Figure 22:
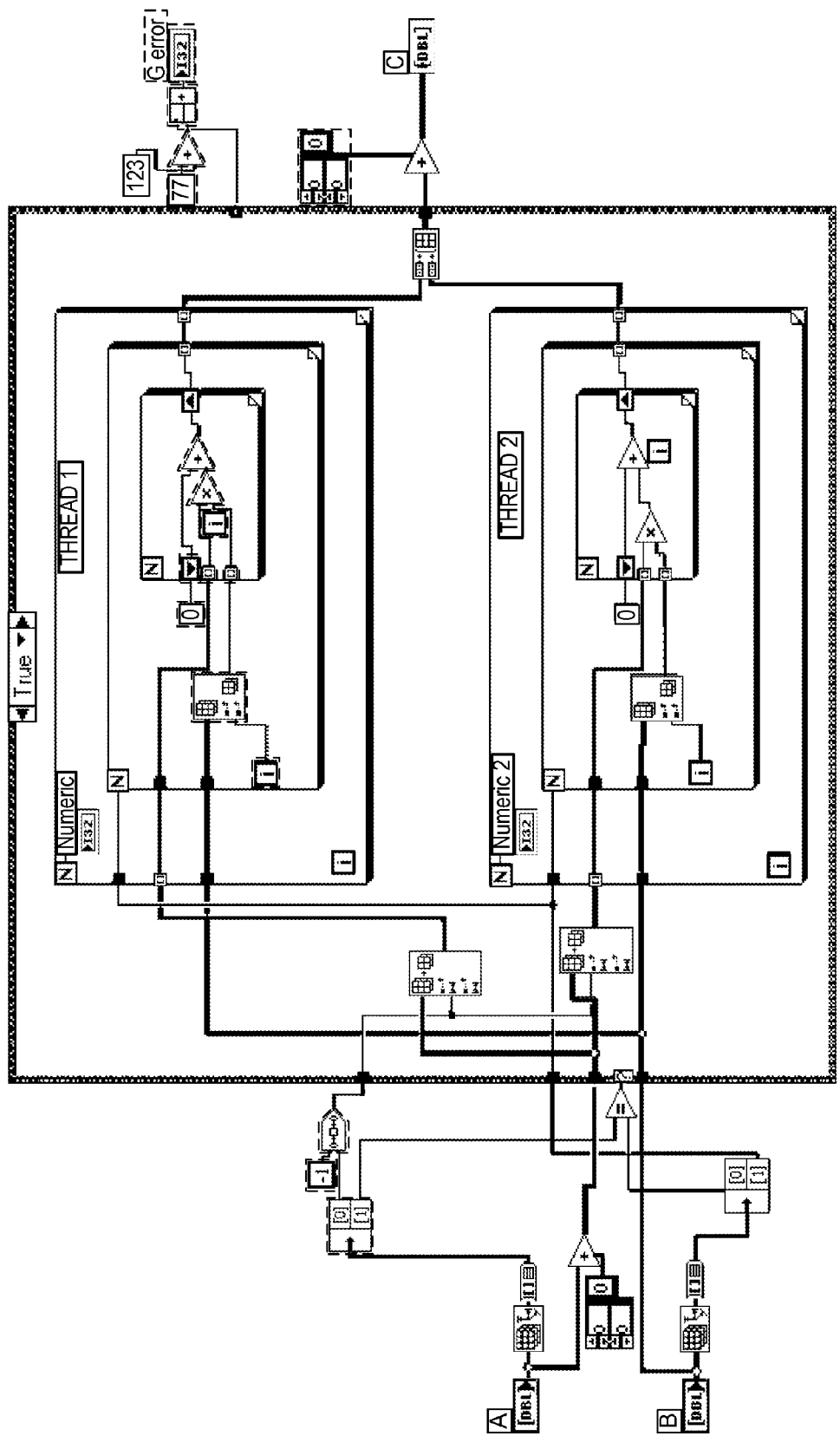

FIG. 21 illustrate an example graphical program in which the user has selected a region 445 which crosses a Structure object boundary. FIG. 22 illustrates the modified graphical program after the user has invoked the re-arrangement feature.

As discussed above, in some embodiments users can mark certain Structure objects for exclusion from re-arrangement so that their inner contents will not be re-arranged when the graphical programming development environment re-arranges the graphical program in response to invocation of the re-arrangement feature. As used herein, a Structure object refers to an object in the graphical program within which other objects are displayed. For example, a Structure object may include a sub-diagram a visible border within which various other objects are displayed. The area within the border may be referred to as a sub-diagram. Examples of Structure objects include While loops, For Loops, and Case Structures. Marking a Structure object for exclusion means that the user does not want the objects within the Structure object's border to be re-arranged.

Figure 23:
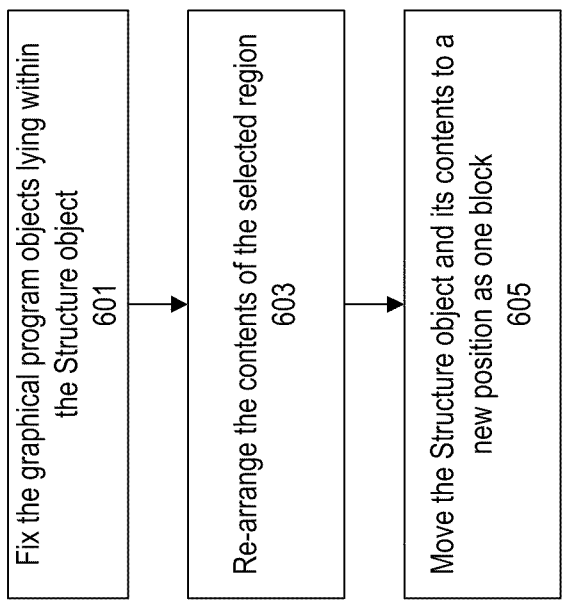
FIG. 23 illustrates an example of a technique the graphical programming development environment may use to implement the exclusion of Structure objects from re-arrangement.

FIG. 23 illustrates an example of a technique the graphical programming development environment may use to implement the exclusion of Structure objects from re-arrangement. As illustrated in 601 the graphical programming development environment may fix the graphical program objects lying within the border of the Structure object, e.g., may consider the locations of these objects to be in fixed positions that should not move relative to each other. In 603, the graphical programming development environment may then perform a re-arrangement algorithm to re-arrange the contents of the portion of the graphical program which the user has selected for re-arrangement. In some embodiments the re-arrangement algorithm may determine that the Structure object needs to be moved to a new position. In 605, the graphical programming development environment may move the Structure object and its contents to a new position. When moving the Structure object, the entire Structure object may be treated as one block. Thus, the objects lying within the border of the Structure object may have the same relative positions to each other as before the graphical program was re-arranged, but their absolute positions may be different. For example, the entire Structure object and its contents may have been shifted up, down, left or right.

Figure 24:
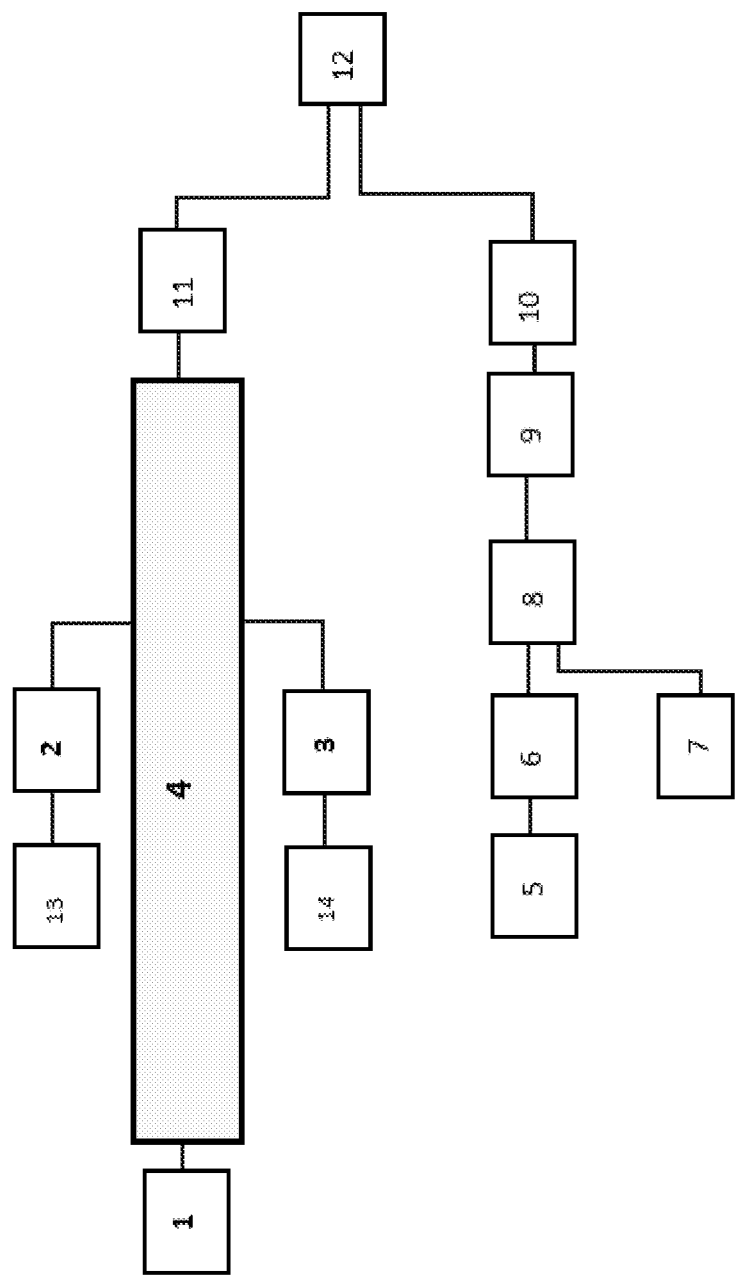
FIGS. 24-26 illustrate various embodiments of an algorithm for re-arranging a graphical program.
Figure 25:
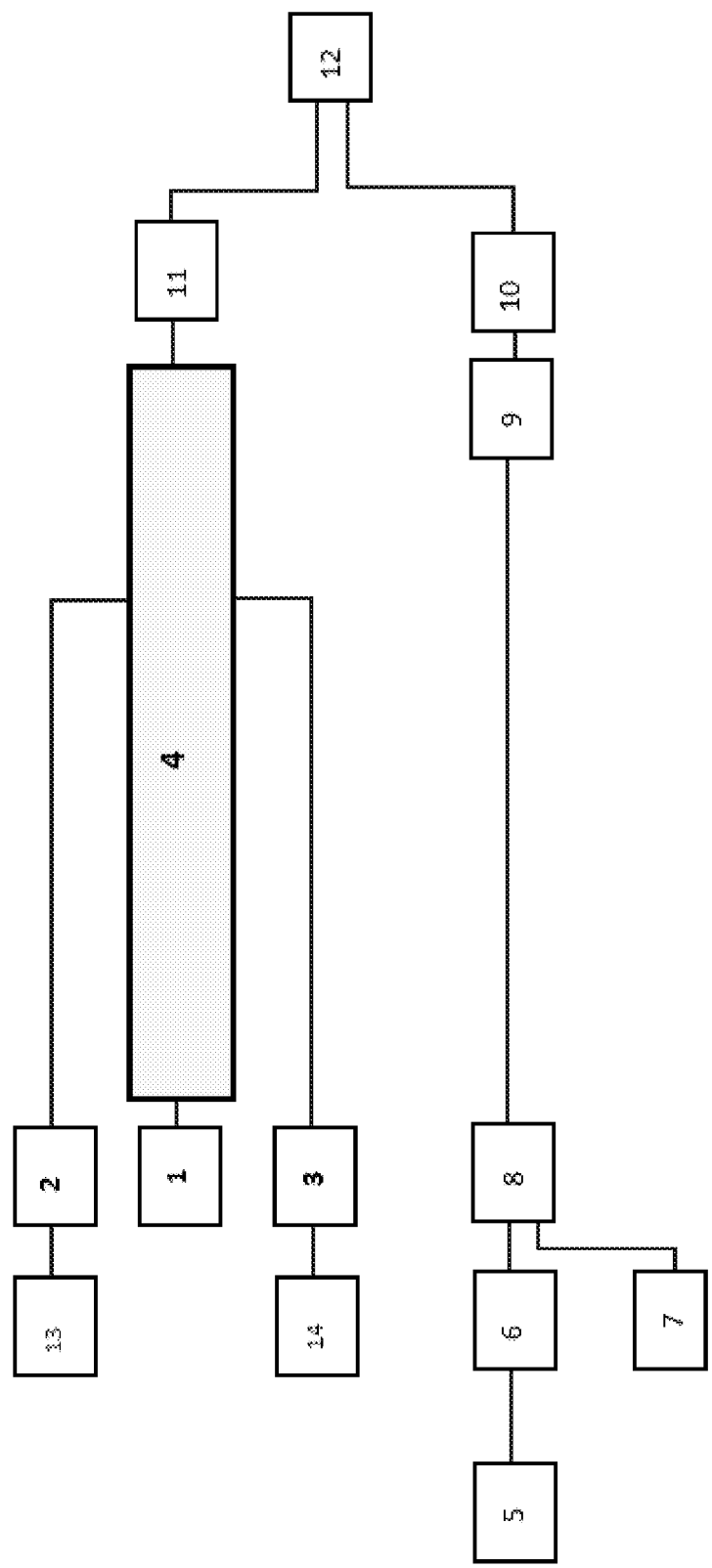

In some embodiments, the graphical programming development environment may achieve a more aesthetically pleasing result by allowing the re-arrangement algorithm to consider the Structure object as a series of smaller individual blocks instead of one large block. This may allow other objects outside the Structure object border to be placed in better positions relative to the Structure object. For example, consider the example graphical program shown in FIG. 24, and suppose that block 4 is a Structure object. (For simplicity in the diagram, block 4 is shown as a simple block, but it may actually have a border that encloses other blocks.) In some embodiments the graphical programming development environment may perform a re-arrangement algorithm that uses horizontal ranks. If the Structure object 4 is very wide with respect to other blocks (as is they often are, and as it is in this example) then in some embodiments the graphical program may be re-arranged in such a way that the Structure object 4 ends up in its own column, e.g., as shown in FIG. 25.

Figure 26:
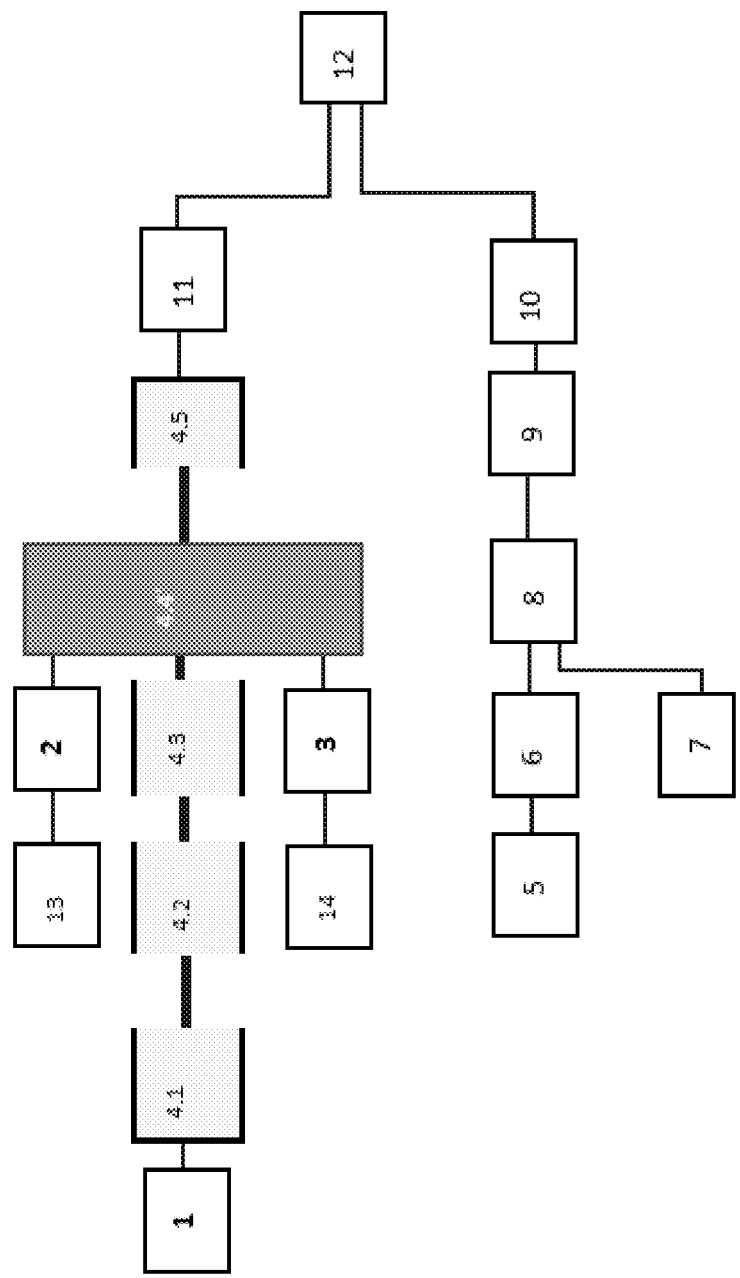

A better result may be achieved by breaking the Structure object 4 into smaller blocks. That is, the re-arrangement algorithm treats the Structure object 4 as a series of smaller blocks to calculate the new positions of other blocks lying outside the Structure object 4. After the re-arrangement is done, however, the Structure object 4 still appears as a single object. In addition, the re-arrangement algorithm may also treat one or more of the smaller blocks into which it breaks the Structure object as having an extended height. This may enable the re-arrangement algorithm to handle wires connected to the top and bottom of the Structure object. FIG. 26 illustrates an example in which the Structure object 4 has been treated by the re-arrangement algorithm as a series of smaller blocks 4.1, 4.2, 4.3, 4.4 and 4.5. The re-arrangement algorithm has also treated the smaller block 4.5 as having an extended height. This enables the algorithm to route wires to the terminals on the top and bottom of the Structure object as if they were normal terminals positioned on the left and right. The result is more aesthetically pleasing than the result shown in FIG. 25.

FIGS. 27-29 illustrate an example of a partial layout algorithm for re-arranging only the selected parts of the graphical program without re-arranging other parts.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-readable memory medium comprising program instructions for positioning objects in a graphical data flow program, wherein the program instructions are executable to:
   display the graphical data flow program on a display, wherein the graphical data flow program includes a plurality of nodes interconnected by connections that visually indicate flow of data to occur among the nodes during execution of the graphical data flow program, wherein the plurality of interconnected nodes visually indicate functionality to be performed by the graphical data flow program during the execution, wherein displaying the graphical data flow program comprises displaying the plurality of interconnected nodes in a block diagram on the display, wherein a first subset of the plurality of interconnected nodes are included in a first portion of the graphical data flow program, wherein a second subset of the plurality of interconnected nodes are included in a second portion of the graphical data flow program;
   automatically re-arrange the first portion of the graphical data flow program, wherein re-arranging the first portion comprises:
      automatically re-positioning the nodes included in the first portion to new positions in the block diagram, wherein re-positioning the nodes included in the first portion comprises changing their relative positioning with respect to each other, wherein the new positions are not determined based on user input specifying positioning information for the new positions; and
      automatically re-positioning the nodes included in the second portion to new positions in the block diagram while retaining their same relative positioning with respect to each other; and
   re-display the graphical data flow program after re-arranging the first portion of the graphical data flow program, wherein re-displaying the graphical data flow program comprises displaying the nodes included in the first portion of the graphical data flow program at changed positions relative to each other and displaying nodes included in the second portion of the graphical data flow program at their same relative positioning with respect to each other.

2. The computer-readable memory medium of claim 1, wherein the program instructions are further executable to:
   receive user input selecting the first portion of the graphical data flow program; and
   graphically indicate that the first portion of the graphical data flow program has been selected in response to the user input.

3. The computer-readable memory medium of claim 2, wherein the user input comprises user input specifying a rectangle around the first portion of the graphical data flow program.

4. The computer-readable memory medium of claim 1, wherein the program instructions are further executable to:
   receive user input requesting the first portion of the graphical data flow program to be re-arranged;
   wherein the first portion of the graphical data flow program is automatically re-arranged in response to the user input.

5. The computer-readable memory medium of claim 1,
   wherein the first portion of the graphical data flow program includes a first node;
   wherein automatically re-arranging the first portion of the graphical data flow program includes:
      analyzing the graphical data flow program to determine an initial position of the first node;
      analyzing the graphical data flow program to determine a new position of the first node; and
      automatically re-positioning the first node from the initial position to the new position.

6. The computer-readable memory medium of claim 1,
   wherein the plurality of nodes of the graphical data flow program are interconnected by a plurality of wires, wherein the first portion of the graphical data flow program includes a first subset of the wires and the second portion of the graphical data flow program includes a second subset of the wires;
   wherein automatically re-arranging the first portion of the graphical comprises automatically re-arranging the first subset of the wires in the first portion without re-arranging the second subset of the wires in the second portion.

7. The computer-readable memory medium of claim 1, wherein in performing said automatically re-positioning the nodes included in the first portion to the new positions in the block diagram, the program instructions are executable to reduce a number of points in which wires that interconnect the nodes included in the first portion cross each other.

8. The computer-readable memory medium of claim 1, wherein the program instructions are executable to automatically re-position the nodes included in the first portion to the new positions in the block diagram such that the block diagram adheres to left-to-right data flow semantics.

9. The computer-readable memory medium of claim 1,
   wherein the first subset of the plurality of interconnected nodes are displayed in a structure object in the graphical data flow program, wherein the program instructions are further executable to select the first portion of the graphical data flow program for rearrangement in response to user input selecting the structure object.

10. The computer-readable memory medium of claim 1, wherein the program instructions are further executable to select the first portion of the graphical data flow program for rearrangement in response to user input specifying a plurality of non-overlapping rectangular regions.

11. A computer-implemented method comprising:
   displaying a graphical data flow program on a display of a computer system, wherein the graphical data flow program includes a plurality of nodes interconnected by connections that visually indicate flow of data to occur among the nodes during execution of the graphical data flow program, wherein the plurality of interconnected nodes visually indicate functionality to be performed by the graphical data flow program during the execution, wherein displaying the graphical data flow program comprises displaying the plurality of interconnected nodes in a block diagram on the display, wherein a first subset of the plurality of interconnected nodes are included in a first portion of the graphical data flow program, wherein a second subset of the plurality of interconnected nodes are included in a second portion of the graphical data flow program;
   automatically re-arranging the first portion of the graphical data flow program, wherein re-arranging the first portion comprises:
      automatically re-positioning the nodes included in the first portion to new positions in the block diagram, wherein re-positioning the nodes included in the first portion comprises changing their relative positioning with respect to each other, wherein the new positions are not determined based on user input specifying positioning information for the new positions; and automatically re-positioning the nodes included in the second portion to new positions in the block diagram while retaining their same relative positioning with respect to each other; and re-displaying the graphical data flow program after re-arranging the first portion of the graphical data flow program, wherein re-displaying the graphical data flow program comprises displaying the nodes included in the first portion of the graphical data flow program at changed positions relative to each other and displaying nodes included in the second portion of the graphical data flow program at their same relative positioning with respect to each other.

12. The computer-implemented method of claim 11, further comprising:
receiving user input selecting the first portion of the graphical data flow program; and
graphically indicating that the first portion of the graphical data flow program has been selected in response to the user input.

13. The computer-implemented method of claim 12, wherein the user input comprises user input specifying a rectangle around the first portion of the graphical data flow program.

14. The computer-implemented method of claim 11, further comprising:
receiving user input requesting the first portion of the graphical data flow program to be re-arranged;
wherein the first portion of the graphical data flow program is automatically re-arranged in response to the user input.

15. The computer-implemented method of claim 11, wherein the first portion of the graphical data flow program includes a first node;
wherein automatically re-arranging the first portion of the graphical data flow program includes:
analyzing the graphical data flow program to determine an initial position of the first node;
analyzing the graphical data flow program to determine a new position of the first node; and
automatically re-positioning the first node from the initial position to the new position.

16. The computer-implemented method of claim 11, wherein the plurality of nodes of the graphical data flow program are interconnected by a plurality of wires, wherein the first portion of the graphical data flow program includes a first subset of the wires and the second portion of the graphical data flow program includes a second subset of the wires;
wherein automatically re-arranging the first portion of the graphical comprises automatically re-arranging the first subset of the wires in the first portion without re-arranging the second subset of the wires in the second portion.

17. A system comprising:
one or more processors;
memory storing program instructions; and
a display device;
wherein the program instructions are executable by the one or more processors to:
display a graphical data flow program on the display device, wherein the graphical data flow program includes a plurality of nodes interconnected by connections that visually indicate flow of data to occur among the nodes during execution of the graphical data flow program, wherein the plurality of interconnected nodes visually indicate functionality to be performed by the graphical data flow program during the execution, wherein displaying the graphical data flow program comprises displaying the plurality of interconnected nodes in a block diagram on the display device, wherein a first subset of the plurality of interconnected nodes are included in a first portion of the graphical data flow program, wherein a second subset of the plurality of interconnected nodes are included in a second portion of the graphical data flow program;

automatically re-arrange the first portion of the graphical data flow program, wherein re-arranging the first portion comprises:
automatically re-positioning the nodes included in the first portion to new positions in the block diagram, wherein re-positioning the nodes included in the first portion comprises changing their relative positioning with respect to each other, wherein the new positions are not determined based on user input specifying positioning information for the new positions; and
automatically re-positioning the nodes included in the second portion to new positions in the block diagram while retaining their same relative positioning with respect to each other; and re-display the graphical data flow program after re-arranging the first portion of the graphical data flow program, wherein re-displaying the graphical data flow program comprises displaying the nodes included in the first portion of the graphical data flow program at changed positions relative to each other and displaying nodes included in the second portion of the graphical data flow program at their same relative positioning with respect to each other.

18. The system of claim 17, wherein the program instructions are further executable by the one or more processors to:
receive user input selecting the first portion of the graphical data flow program; and graphically indicate that the first portion of the graphical data flow program has been selected in response to the user input.

19. The system of claim 17,
wherein the user input comprises user input specifying a rectangle around the first portion of the graphical data flow program.

20. The system of claim 17, wherein the program instructions are further executable by the one or more processors to:
receive user input requesting the first portion of the graphical data flow program to be re-arranged;
wherein the first portion of the graphical data flow program is automatically re-arranged in response to the user input.

21. The system of claim 17,
wherein the plurality of nodes of the graphical data flow program are interconnected by a plurality of wires, wherein the first portion of the graphical data flow program includes a first subset of the wires and the second portion of the graphical data flow program includes a second subset of the wires;
wherein automatically re-arranging the first portion of the graphical comprises automatically re-arranging the first subset of the wires in the first portion without re-arranging the second subset of the wires in the second portion.

* * * * *